(12) United States Patent
Wang et al.

(10) Patent No.: US 10,888,955 B2
(45) Date of Patent: Jan. 12, 2021

(54) AVOIDING HOT CRACKS DURING LASER WELDING OF A WORKPIECE STACK-UP ASSEMBLY OF ALUMINUM ALLOY WORKPIECES

(71) Applicant: GM GLOBAL TECHNOLOGY OPERATIONS LLC, Detroit, MI (US)

(72) Inventors: Hui-Ping Wang, Troy, MI (US); Michael G. Poss, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 658 days.

(21) Appl. No.: 15/445,164

(22) Filed: Feb. 28, 2017

(65) Prior Publication Data

US 2018/0243861 A1 Aug. 30, 2018

(51) Int. Cl.

| | |
|---|---|
| *B23K 31/02* | (2006.01) |
| *B23K 26/06* | (2014.01) |
| *B23K 26/322* | (2014.01) |
| *B23K 26/244* | (2014.01) |
| *B23K 26/32* | (2014.01) |
| *B23K 101/00* | (2006.01) |
| *B23K 103/10* | (2006.01) |

(52) U.S. Cl.
CPC ........ *B23K 26/0626* (2013.01); *B23K 26/244* (2015.10); *B23K 26/32* (2013.01); *B23K 26/322* (2013.01); *B23K 2101/006* (2018.08); *B23K 2103/10* (2018.08)

(58) Field of Classification Search
CPC . B23K 26/0626; B23K 26/244; B23K 26/322
See application file for complete search history.

(56) References Cited

U.S. PATENT DOCUMENTS

| 4,859,544 | A | * | 8/1989 | Schwellinger | ....... | B23K 35/288 |
|---|---|---|---|---|---|---|
| | | | | | | 428/654 |
| 9,000,327 | B2 | * | 4/2015 | Yoshikawa | .......... | B23K 26/073 |
| | | | | | | 219/121.63 |
| 2011/0095003 | A1 | * | 4/2011 | Sakurai | ................ | B23K 1/0056 |
| | | | | | | 219/121.64 |
| 2018/0021888 | A1 | * | 1/2018 | Liu | ...................... | B23K 26/035 |
| | | | | | | 219/121.64 |
| 2018/0056441 | A1 | * | 3/2018 | Matsumoto | ........ | B23K 26/0626 |
| 2018/0111226 | A1 | * | 4/2018 | Wang | ..................... | B23K 26/26 |
| 2019/0039176 | A1 | * | 2/2019 | Speker | ................... | B23K 26/06 |

* cited by examiner

*Primary Examiner* — Serkan Akar
*Assistant Examiner* — Ahmad Abdel-Rahman
(74) *Attorney, Agent, or Firm* — Reising Ethington P.C.

(57) ABSTRACT

A method of laser welding a workpiece stack-up that includes two or more overlapping aluminum alloy workpieces is disclosed. The method involves controlling the power level of the laser beam during at least one of an initial stage or a final stage of advancing the laser beam along a weld path so as to limit a line energy of the laser beam during such stage or stages to being no greater than 10% above a line energy of the laser beam during an intermediate stage of laser beam advancement that is performed between the initial and final stages. By limiting the line energy during the initial and/or final stages of laser beam advancement along the weld path, excessive fusion of the workpiece stack-up assembly can be avoided in those locations to help protect against hot-cracking in the resultant laser weld joint.

20 Claims, 6 Drawing Sheets

AVOIDING HOT CRACKS DURING LASER WELDING OF A WORKPIECE STACK-UP ASSEMBLY OF ALUMINUM ALLOY WORKPIECES

TECHNICAL FIELD

The technical field of this disclosure relates generally to laser welding and, more particularly, to laser welding of overlapping aluminum alloy workpieces.

INTRODUCTION

Conventional laser welding is a metal joining process in which a laser beam is directed at an assembly of stacked-up metal workpieces to provide a concentrated heat source capable of effectuating a weld joint between the component metal workpieces. In general, complimentary flanges or other bonding regions of two or more metal workpieces are first aligned, fitted, and stacked relative to one another such that their faying surfaces overlap and confront to establish one or more faying interfaces. A laser optic welding head then directs a laser beam at an accessible surface of the workpiece stack-up assembly within a welding region spanned by the overlapping portion of the workpieces. The heat generated from the absorption of energy from the laser beam initiates melting of the metal workpieces and establishes a molten weld pool within the workpiece stack-up assembly. The molten weld pool penetrates through the metal workpiece impinged by the laser beam and at least partially into the underlying metal workpiece(s).

When the laser beam has a high enough power density, a keyhole is produced within the molten weld pool directly underneath an impingement point of the laser beam (a process known as "keyhole welding"). A keyhole is a column of vaporized metal derived from the metal workpieces within the workpiece stack-up assembly that may include plasma. Due to the fact that laser energy is more readily transferred through the vapor/plasma medium of a keyhole than the molten metal medium of the weld pool, the keyhole provides a conduit for deeper energy absorption into workpiece stack-up assembly which, in turn, facilitates deeper and narrower penetration of the molten weld pool into the stack-up assembly, and a tightly-confined heat-affected zone, compared to instances in which the keyhole is not present. The keyhole is normally controlled during laser welding operations to penetrate into the workpiece stack-up assembly across each of the established faying interfaces, resulting in either full or partial penetration through the bottommost metal workpiece of the assembly.

The keyhole and the surrounding molten metal weld pool are created in very short order once the laser beam impinges the accessible surface of the workpiece stack-up assembly. After the keyhole and the molten metal weld pool are formed, the laser optic welding head is moved robotically in the space above the workpiece stack-up assembly to advance the laser beam relative to the accessible surface of the stack-up assembly and to thus convey the impingement point of the laser beam along a predefined weld path. Such advancement of the laser beam translates the keyhole along a corresponding route within the stack-up assembly and causes the molten metal weld pool to flow around and behind the keyhole and to elongate in the wake of the advancing laser beam. The advancement of laser beam along the weld path and the corresponding translation of the keyhole and the molten metal weld pool results in a laser weld joint comprised of resolidified, coalesced workpiece material being formed within the stack-up assembly and fusion welding the two or more metal workpieces together. The shape, contour, and visual appearance of the laser weld joint depend to a large extent on the profile of the navigated weld path.

Many industries use laser welding as part of their manufacturing practice including the automotive, aviation, maritime, railway, and building construction industries, among others. Laser welding is an attractive joining process because it requires only single side access, can be practiced with reduced flange widths, and results in a relatively small heat-affected zone within the stack-up assembly that minimizes thermal distortion in the metal workpieces. In the automotive industry, for example, laser welding can be used to join together metal workpieces during the manufacture of the body-in-white (BIW) as well as finished hang-on parts that are installed on the BIW prior to painting. Some specific instances where laser welding may be used include the construction and attachment of load-bearing body structures within the BIW such as rail structures, rockers, A-, B-, and C-pillars, and underbody cross-members. Other specific instances where laser welding may also be used include non-load-bearing attachments within the BIW, such as the attachment of a roof to a side panel, and to join overlying flanges encountered in the construction of the doors, hood, and trunk.

In an effort to incorporate lighter weight materials into a motor vehicle, and thus improve fuel economy, there has been a push to incorporate aluminum alloys into the vehicle platform wherever practical. A stack-up assembly of overlapping aluminum alloy workpieces is a promising candidate for laser welding. In some instances, however, particularly when at least one of the aluminum alloy workpieces is composed of a crack-sensitive 5XXX, 6XXX, or 7XXX series aluminum alloy, the laser weld joint may experience hot-cracking which, in turn, can keep the joint from attaining its maximum strength and other mechanical properties. Hot-cracking occurs during solidification of the molten aluminum alloy material produced by the laser beam when strain at the fusion boundary of the weld zone exceeds material ductility. This strain is believed to cause the liquid film between grains to break and form a cavity where insufficient liquid metal is available to backfill the cavity, thus inducing out-of-plane deformation of one or more of the overlapping aluminum alloy workpieces. When such deformation occurs, the resultant tensile strain imparted to the solidifying molten workpiece material causes a crack to propagate upwards from a root of the weld joint towards the top surface of the joint at the accessible top surface of stack-up assembly.

While hot-cracking is a concern generally when laser welding aluminum alloys, and especially when one of the aluminum alloy workpieces is composed of a 5XXX, 6XXX, or 7XXX series aluminum alloy, there are certain periods of the laser welding process that have been found to be more nurturing to hot-cracking. In particular, the advancement of the laser beam along the weld path can be viewed as progressing through three stages: (1) the initial stage when the laser beam is initially transmitted into the workpiece stack-up assembly and a travel speed of the laser beam along the accessible top surface of the stack-up assembly is accelerated up to its target travel speed through corresponding accelerating movement of the laser optic welding head; (2) an intermediate stage when the travel speed and the power level of the laser beam are maintained at their target values; and (3) the final stage when the travel speed of the laser beam is decelerated from its target travel speed through corresponding decelerating movement of the laser optic welding head and the transmission of the laser beam into the workpiece stack-up assembly is halted. The amount of time required to complete initial and final stages of laser beam advancement along the weld path is usually much less than the amount of time devoted to intervening intermediate stage.

The resolidified aluminum material of the laser weld joint tends to be more susceptible to hot-cracking during the initial and final stages of laser beam advancement along the weld path. These stages are more liable to promote hot-cracking within the corresponding portions of the laser weld joint because of the differences in response time between (1) initiating/halting transmission of the laser beam and (2) accelerating/decelerating movement of the laser optic welding head. Specifically, the transmission of the laser beam to the workpiece stack-up can be initiated and halted almost instantaneously, while the laser beam typically takes a longer time to accelerate to, and decelerate from, its target travel speed based on the inertial effect associated with robotically moving the laser optic welding head. The slower response time of the laser beam results in the laser beam having excess line energy during the acceleration (initial stage) and deceleration (final stage) of the laser beam via movement of the welding head at the beginning and ending portions of the weld path. The locally high heat input attributed to the excess line energy causes excessive fusion of the aluminum alloy workpieces compared to the intermediate stage. The excessive fusion triggered at the beginning and ending portions of the weld path creates a cradle or pear-shaped bulbous anomaly within the laser weld joint at each of the beginning and ending portions of the weld path that is believed to engender hot-cracking.

SUMMARY

A method of laser welding a workpiece stack-up assembly that includes at least two aluminum alloy workpieces according to one embodiment of the present disclosure includes several steps. First, a workpiece stack-up assembly that includes at least a first aluminum alloy workpiece and a second aluminum alloy workpiece that overlap one another to establish a faying interface between the workpieces is provided. The first aluminum alloy workpiece providing an accessible top surface of the workpiece stack-up. Second, a laser beam is transmitted at the accessible top surface of the workpiece stack-up assembly to create a keyhole within the workpiece stack-up and a molten aluminum alloy weld pool that surrounds the keyhole. The keyhole and the molten aluminum alloy weld pool traverse at least the faying interface established between the first and second aluminum alloy workpieces. Third, the laser beam is advanced relative to the accessible top surface of the workpiece stack-up to convey an impingement point of the laser beam along a weld path that includes a beginning portion and an ending portion so as to translate the keyhole and the surrounding molten aluminum alloy weld pool along a corresponding route within the workpiece stack-up assembly. And fourth, the power level of the laser beam is controlled during at least one of an initial stage or a final stage of advancing the laser beam along the weld path to limit a line energy of the laser beam to being no greater than 10% above a line energy of the laser beam during an intermediate stage of advancing the laser beam along the weld path. The initial stage covers advancement of the laser beam along the beginning portion of the weld path, the final stage covers advancement of the laser beam along the ending portion of the weld path, and the intermediate stage covers advancement of the laser beam along a middle portion of the weld path between the beginning and ending portions.

The workpiece stack-up assembly may include at least two aluminum alloy workpieces. For instance, in one embodiment, the first aluminum alloy workpiece has an outer surface and a first faying surface, and the second aluminum alloy workpiece has an outer surface and a second faying surface. The outer surface of the first aluminum alloy workpiece provides the accessible top surface of the workpiece stack-up assembly and the outer surface of the second aluminum alloy workpiece provides a bottom surface of the workpiece stack-up assembly. The first faying surface of the first aluminum alloy workpiece and the second faying surface of the second aluminum alloy workpiece establish the faying interface.

The workpiece stack-up assembly may also include a third aluminum alloy workpiece that overlaps the second aluminum alloy workpiece, opposite the first aluminum alloy workpiece, to establish a second faying interface. The first aluminum alloy workpiece has an outer surface and a first faying surface, the third aluminum alloy workpiece has an outer surface and a fourth faying surface, and the second aluminum alloy workpiece has opposed second and third faying surfaces. The outer surface of the first aluminum alloy workpiece provides the top accessible surface of the workpiece stack-up assembly and the outer surface of the third aluminum alloy workpiece provides a bottom surface of the workpiece stack-up assembly.

Additionally, the first faying surface of the first aluminum alloy workpiece and the second faying surface of the second aluminum alloy workpiece establish a first faying interface, and the third faying surface of the second aluminum alloy workpiece and the fourth faying surface of the third aluminum alloy workpiece establish the second faying interface. When the workpiece stack-up assembly includes the first, second, and third aluminum alloy workpieces, the keyhole and the molten aluminum alloy weld pool traverse both the first and second faying interfaces.

During the intermediate stage of advancing the laser beam along the weld path, the power level of the laser beam is maintained at a target power level and the travel speed of the laser beam is maintained at a target travel speed. The target power level may be between 2 kW and 6 kW and the target travel speed may be between 2 m/min and 5 m/min. Regarding the initial stage of advancing the laser beam along the weld path, the laser beam is initially transmitted into the workpiece stack-up assembly and the power level of the laser beam is increased at a controlled rate up to the target power level while the travel speed of the laser beam along the weld path is accelerated up to the target travel speed. The laser beam may even be initially transmitted into the workpiece stack-up assembly after a laser optic welding head that transmits the laser beam into the workpiece assembly has begun accelerating forward from a rest position. Regarding the final stage of advancing the laser beam along the weld path, the power level of the laser beam is decreased at a controlled rate down from the target power level while the travel speed of the laser beam along the weld path is decelerated from the target travel speed, and the transmission of the laser beam into the workpiece stack-up assembly is halted. The transmission of the laser beam into the workpiece stack-up may even be halted before a laser optic welding head that transmits the laser beam into the workpiece assembly has finished decelerating to a rest position.

The initial stage of advancing the laser beam along the weld path may last from 0.3 seconds to 0.7 seconds, the intermediate stage of advancing the laser beam along the weld path may last from 1 second to 200 seconds, and the final stage of advancing the laser beam along the weld path may last from 0.3 seconds to 0.7 seconds. Furthermore, the line energy of the laser beam during the intermediate stage of advancing the laser beam along the weld path is between 24,000 J/m and 180,000 J/m. And in this particular embodiment of the disclosed method, the line energy of the laser beam during at least one of the initial stage or the final stage of advancing the laser beam along the weld path is equal to or less than the line energy of the laser beam during the intermediate stage of advancing the laser beam along the weld path.

The aluminum alloy workpieces included in the workpiece stack-up may be any of a wide variety of laser weldable aluminum alloys. For example, at least one of the first or second aluminum alloy workpieces may comprise a non-heat-treatable aluminum alloy base layer that includes between 0.2 wt % and 6.2 wt % magnesium. As another example, at least one of the first or second aluminum alloy workpieces may comprise a heat-treatable aluminum alloy base layer that includes between 0.2 wt % and 3.0 wt % magnesium and 0.2 wt % and 1.8 wt % silicon. And, in yet another example, at least one of the first or second aluminum alloy workpieces may comprise a heat-treatable aluminum alloy base layer that includes between 0.8 wt % and 12 wt % zinc.

A method of laser welding a workpiece stack-up assembly that includes at least two aluminum alloy workpieces according to another embodiment of the present disclosure includes several steps. First, a laser beam is transmitted into a workpiece stack-up assembly that includes at least two overlapping aluminum alloy workpieces. The laser beam has a power level and impinges an accessible top surface of the workpiece stack-up assembly within a welding region. Second, the power level of the laser beam is increased at a controlled rate up to a target power level while the laser beam is advanced relative to the accessible top surface of the workpiece stack-up assembly along a beginning portion of a weld path during which time a travel speed of the laser beam is accelerated up to a target travel speed. Third, the power level of the laser beam and the travel speed of the laser beam are maintained at the target power level and the target travel speed, respectively, while the laser beam is advanced relative to the accessible top surface of the workpiece stack-up assembly along a middle portion of the weld path. Fourth, the power level of the laser beam is decreased at a controlled rate down from the target power level while the laser beam is advanced relative to the accessible top surface of the workpiece stack-up assembly along an ending portion of the weld path during which time the travel speed of the laser beam is decelerated down from the target travel speed. And fifth, the transmission of the laser beam into the workpiece stack-up assembly is halted. The foregoing advancement of the laser beam along the weld path from the beginning portion to the ending portion forms a laser weld joint comprised of resolidified aluminum alloy workpiece material that penetrates through the workpiece stack-up assembly from the accessible top surface and at least across a faying interface established between the first and second aluminum alloy workpieces to fusion weld at least the first and second aluminum alloy workpieces together.

The workpiece stack-up assembly may include only a first aluminum alloy workpiece and a second aluminum alloy workpiece. In another implementation, however, the workpiece stack-up assembly may further include a third aluminum alloy workpiece that overlaps and contacts the second aluminum alloy workpiece to establish a second faying interface within the workpiece stack-up. When the workpiece stack-up assembly includes the first, second, and third aluminum alloy workpieces, the keyhole and the molten aluminum alloy weld pool traverse both the first and second faying interfaces such that the laser weld joint fusion welds the first, second, and third aluminum alloy workpieces together.

When increasing the power level of the laser beam at a controlled rate, the power level may be increased from below the target power level up to the target power level at a controlled rate of 2.8 kW/s to 20 kW/s while, at the same time, the travel speed of the laser beam may be accelerated up to the target travel speed at a rate of 170 m/min$^2$ to 1200 m/min$^2$. The target power level may be between 2 kW and 6 kW and the target travel speed of the laser beam may be between 2 m/min and 5 m/min. And, when decreasing the power level of the laser beam at a controlled rate, the power level may be decreased from the target power level to below the target power level at a controlled rate of 2.8 kW/s to 20 kW/s while, at the same time, the travel speed of the laser beam is decelerated from the target travel speed at a rate of 170 m/min$^2$ to 1200 m/min$^2$. It should be noted that the "controlled rate" at which the power level of the laser beam is increased to and decreased from the target power level can involve increasing and/or decreasing the power level either linearly at a constant rate or nonlinearly at a changing or variable rate, and, likewise, the travel speed of the laser beam may be accelerated to or decelerated from the target travel speed either linearly at a constant acceleration/deceleration or nonlinearly at a changing or variable acceleration/deceleration.

A method of laser welding a workpiece stack-up assembly that includes at least two aluminum alloy workpieces according to another embodiment of the present disclosure includes several steps. First, a laser beam is advanced relative to an accessible top surface of a workpiece stack-up assembly that includes at least two overlapping aluminum alloy workpieces to form a laser weld joint that fusion welds the at least two overlapping aluminum alloy workpieces together. The laser beam is advanced along a weld path that includes a beginning portion, and a middle portion following the beginning portion, and an ending portion following the middle portion. The laser beam has a power level and is advanced along the weld path at a travel speed. And, during advancement of the laser beam along the middle portion of the weld path, the power level of the laser beam is maintained at a target power level and the travel speed of the laser beam is maintained at a target travel speed to provide the laser beam with a line energy along the middle portion of the weld path. Second, the power level of the laser beam is increased up to the target power level at a controlled rate during advancement of the laser beam along the beginning portion of the weld path while the travel speed of the laser beam along the weld path is accelerated up to the target travel speed. The increasing of the power level of the laser beam up to the target power level at a controlled rate keeps a line energy of the laser beam along the beginning portion of the weld path equal to or less than the line energy along the middle portion of the weld path. Third, the power level of the laser beam is decreased down from the target power level at a controlled rate during advancement of the laser beam along the ending portion of the weld path while the travel speed of the laser beam along the weld path is decelerated from the target travel speed. The decreasing of the power level of the laser beam down from the target power level at a controlled rate keeps a line energy of the laser beam along the ending portion of the weld path equal to or less than the line energy along the middle portion of the weld path.

DETAILED DESCRIPTION

The disclosed method of laser welding a workpiece stack-up assembly that includes two or more overlapping aluminum alloy workpieces can successfully fusion weld the workpieces together while counteracting the susceptibility of the resultant laser weld joint to hot-cracking. The disclosed method, more specifically, seeks to mitigate hot-cracking during the initial and/or final stages of laser beam advancement along a predefined weld path by controlling the power level of the laser beam so as to limit a line energy of the laser beam. By limiting the line energy in this way, excessive fusion of the aluminum alloy workpieces is prevented at the beginning and/or ending portions of the weld path. The line energy of the laser beam can be limited as needed by increasing the power level of the laser beam at a controlled rate during the initial stage of laser beam advancement along the weld path and/or decreasing the power level of the laser beam at a controlled rate during the final stage of laser beam advancement along the weld path. When increasing/decreasing the power level of the laser beam at a controlled rate, a more gradual change in the power level is orchestrated—as compared to an otherwise instantaneous initiating/halting of the transmission of the laser beam—to accommodate for the slower response time of the robotically-moveable laser optic welding head.

Figure 1:
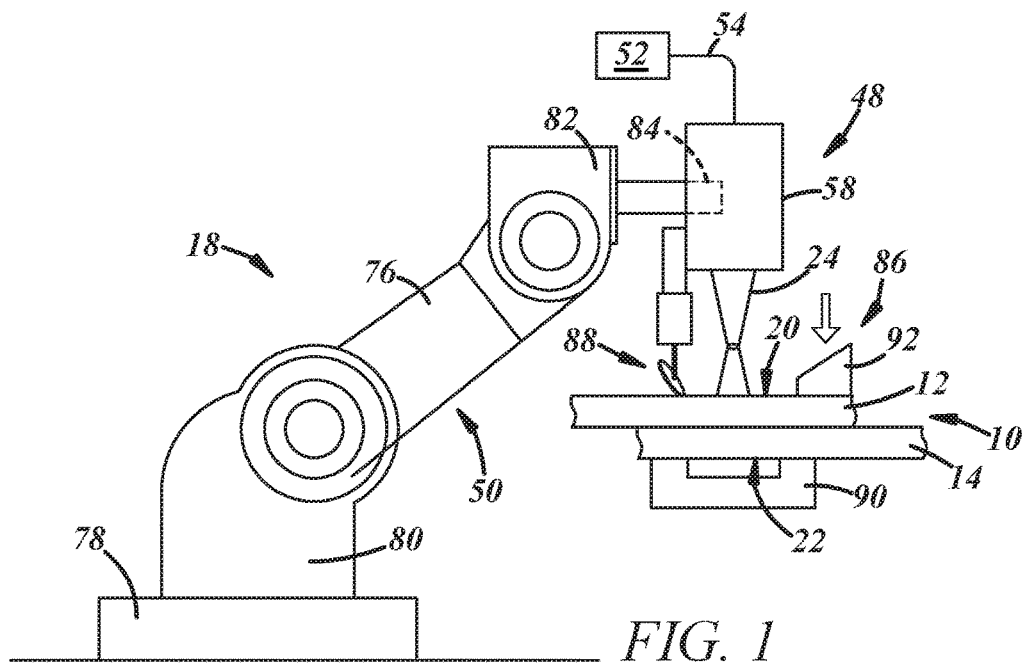
FIG. 1 is a general illustration of a conventional laser welding apparatus that can carry out the disclosed laser welding method on a workpiece stack-up assembly comprised of at least two overlapping aluminum alloy workpieces.
Figure 2:
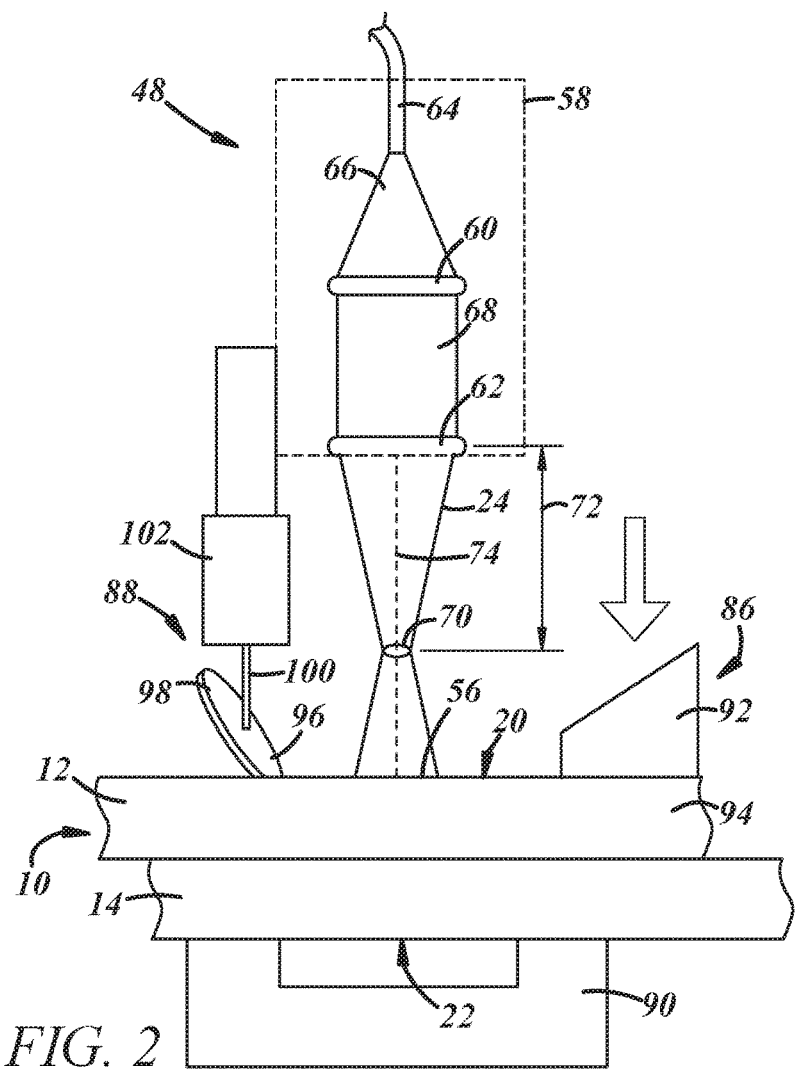
FIG. 2 is a magnified general illustration of the laser optic welding head of the conventional laser welding apparatus depicted in FIG. 1.

Referring now to FIGS. 1-2, a workpiece stack-up assembly 10 undergoing laser welding is shown in which the stack-up assembly 10 includes a first aluminum alloy workpiece 12 and a second aluminum alloy workpiece 14. The first and second aluminum alloy workpieces 12, 14 overlap to define a welding region 16 where laser welding is conducted using a conventional laser welding apparatus 18. Within the confines of the welding region 16, the first and second aluminum alloy workpieces 12, 14 provide an accessible top surface 20 and a bottom surface 22, respectively, of the workpiece stack-up assembly 10. The accessible top surface 20 of the workpiece stack-up assembly 10 is made available to the conventional laser welding apparatus 18 and is accessible by a laser beam 24 emanating from the laser welding apparatus 18. And since only single side access is needed to conduct conventional laser welding, there is no need for the bottom surface 22 of the workpiece stack-up assembly 10 to be made available to the laser welding apparatus 18 in the same way as the accessible top surface 20. The terms "top surface" and "bottom surface" as used herein are relative designations that identify the surface of the stack-up 10 assembly (top surface) that is more proximate to and facing the conventional laser welding apparatus 18 and the surface of the stack-up assembly 10 (bottom surface) that is facing in the opposite direction.

Figure 3:
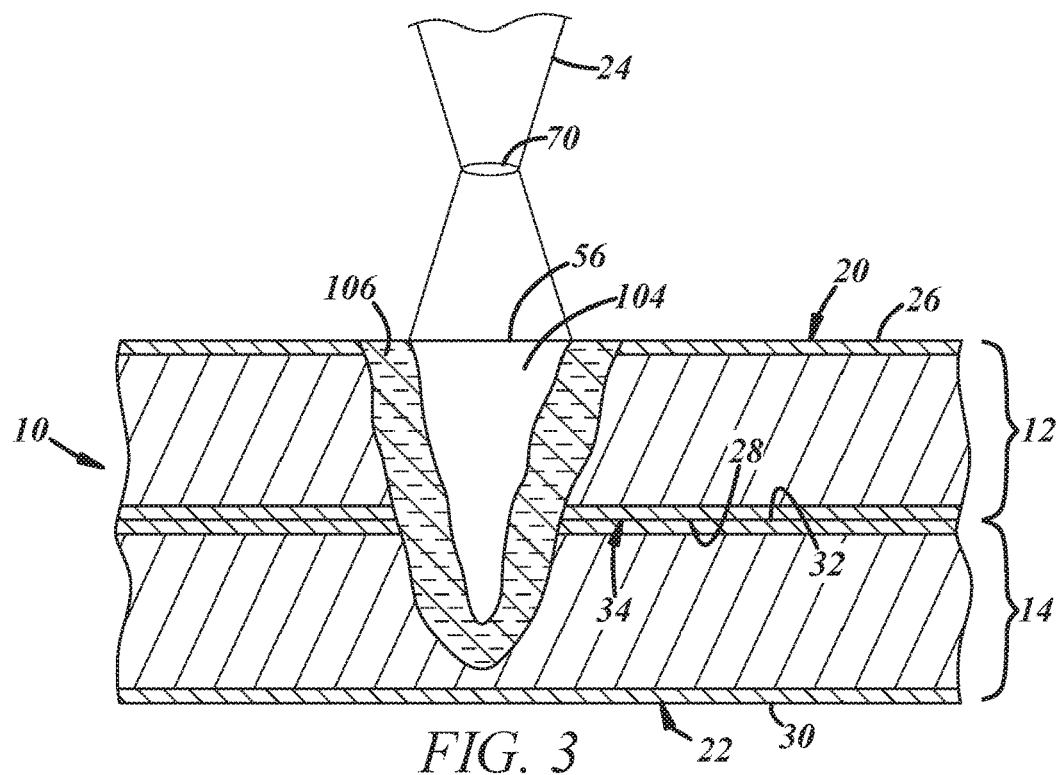
FIG. 3 is a cross-sectional view of a workpiece stack-up assembly undergoing laser welding in which the stack-up assembly includes a first aluminum alloy workpiece and a second aluminum alloy workpiece according to one aspect of the present disclosure.

The workpiece stack-up assembly 10 may include only the first and second aluminum alloy workpieces 12, 14, as shown in FIGS. 1-3. Under these circumstances, and as shown best in FIG. 3, the first aluminum alloy workpiece 12 includes an outer surface 26 and a first faying surface 28, and the second aluminum alloy workpiece 14 includes an outer surface 30 and a second faying surface 32. The outer surface 26 of the first aluminum alloy workpiece 12 provides the accessible top surface 20 of the workpiece stack-up assembly 10 and the outer surface 30 of the second aluminum alloy workpiece 14 provides the oppositely-facing bottom surface 22 of the stack-up assembly 10. And, since the two aluminum alloy workpieces 12, 14 are the only workpieces present in the workpiece stack-up assembly 10, the first and second faying surfaces 28, 32 of the first and second aluminum alloy workpieces 12, 14 overlap and confront within the welding region 16 to establish a faying interface 34. The workpiece stack-up assembly 10 may, of course, include more than two aluminum alloy workpieces, as discussed below, and the laser welding method can be carried out in much the same way and according to the same principles regardless of the number of aluminum alloy workpieces present in the stack-up assembly 10.

The term "faying interface" is used broadly in the present disclosure and is intended to encompass a wide range of overlapping relationships between the confronting first and second faying surfaces 28, 32 that can accommodate the practice of conventional laser welding. For instance, the faying surfaces 28, 32 may establish the faying interface 34 by being in direct or indirect contact. The faying surfaces 28, 32 are in direct contact with each other when they physically abut and are not separated by a discrete intervening material layer or gaps that fall outside of normal assembly tolerance ranges. The faying surfaces 28, 32 are in indirect contact when they are separated by a discrete intervening material layer such as a sealer or adhesive—and thus do not experience the type of interfacial abutment that typifies direct contact—yet are in close enough proximity that laser welding can be practiced. As another example, the faying surfaces 28, 32 may establish the faying interface 34 by being separated by imposed gaps. Such gaps may be imposed between the faying surfaces 28, 32 by creating protruding features on one or both of the faying surfaces 28, 32 through laser scoring, mechanical dimpling, or otherwise. The protruding features maintain intermittent contact points between the faying surfaces 28, 32 that keep the surfaces 28, 32 spaced apart outside of and around the contact points by up to 1.0 mm, preferably, between 0.2 mm and 0.8 mm.

Figure 4:
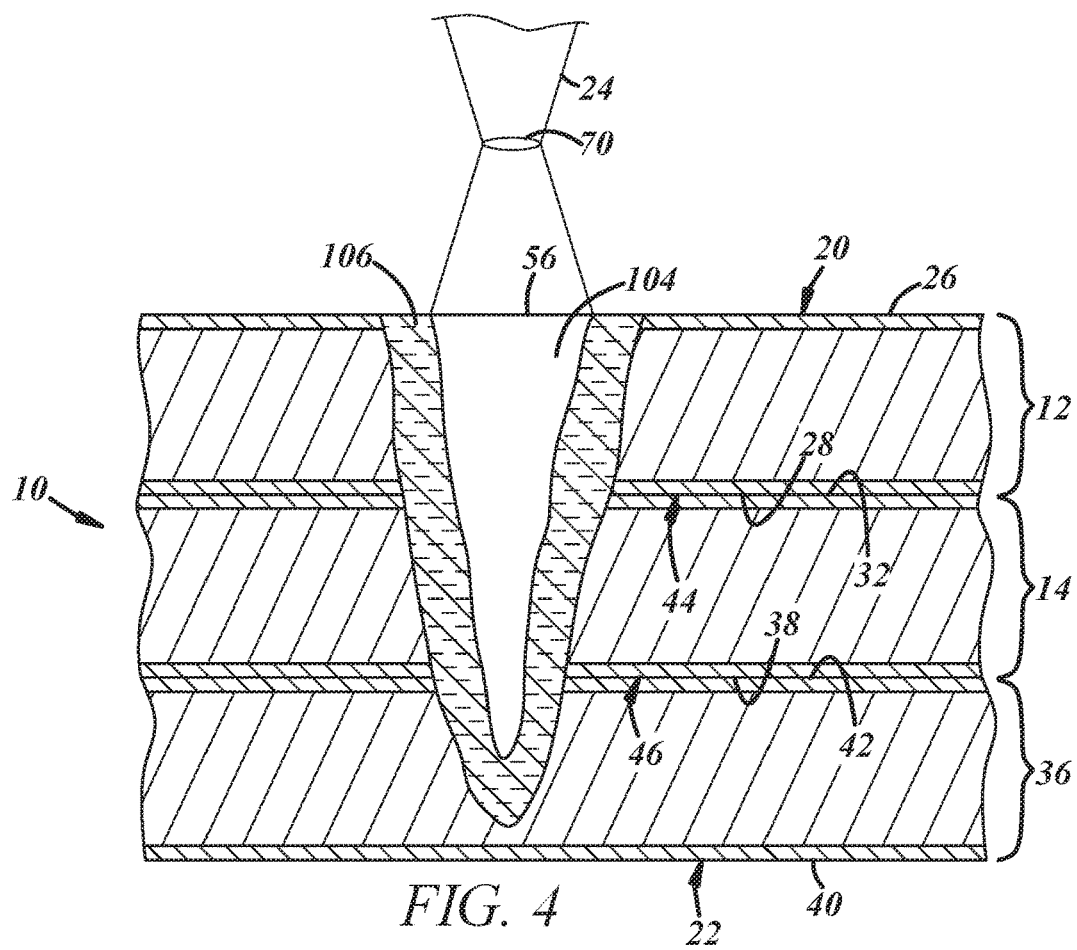
FIG. 4 is a cross-sectional view of a workpiece stack-up assembly undergoing laser welding in which the stack-up assembly includes a first aluminum alloy workpiece, a second aluminum alloy workpiece, and a third aluminum alloy workpiece according to another aspect of the present disclosure.

In other embodiments, as depicted in FIG. 4, the workpiece stack-up assembly 10 may include an additional third aluminum alloy workpiece 36 that overlaps and is disposed adjacent to the second aluminum alloy workpiece 14 such that the welding region 16 of the stack-up assembly 10 now comprises three overlapping aluminum alloy workpieces instead of two. In this scenario, and similar to before, the first aluminum alloy workpiece still includes the outer surface 26 and the first faying surface 28 while the second aluminum alloy workpiece 14 still includes the second faying surface 32. The second aluminum alloy workpiece 14, however, now includes a third faying surface 38 and the third aluminum alloy workpiece 36 includes an outer surface 40 and a fourth faying surface 42. Accordingly, within the welding region 16, the first and second faying surfaces 28, 32 of the first and second aluminum alloy workpieces 12, 14 overlap and confront to establish a first faying interface 44 and the third and fourth faying surfaces 38, 42 of the second and third aluminum alloy workpieces 14, 36 overlap and confront to establish a second faying interface 46. These faying interfaces 44, 46 are the same type and encompass the same attributes as the faying interface 34 described above. The outer surfaces 26, 40 of the flanking first and third aluminum alloy workpieces 12, 36 constitute the accessible top surface 20 and bottom surface 20, respectively, of the workpiece stack-up assembly 10.

Each of the aluminum alloy workpieces 12, 14 (and possibly 36) included in the workpiece stack-up assembly 10 comprises an aluminum alloy base layer composed of a laser weldable aluminum alloy composition that includes at least 85 wt % aluminum, and more preferably at least 90 wt % aluminum. The aluminum alloy base layer included in each workpiece 12, 14, 36 may be a wrought sheet metal layer, plate, or extrusion, although it may also be a casting or other weldable substrate if desired, and may include a natural refractory oxide coating or an alternative applied surface coating such as zinc, tin, or a metal conversion coating. Taking into account the thickness of the aluminum alloy base layer and any additional surface coatings that may be present, each of the aluminum alloy workpieces 12, 14, 36 may have a thickness in the range of 0.3 mm to about 6.0 mm and, more specifically, in the range of 0.5 mm to 3.0 mm, at least in the welding region 16. And while the aluminum alloy workpieces 12, 14, 36 may be the same in all relevant respects, they are not required to be, as the workpieces 12, 14, 16 included in the workpiece stack-up assembly 10 may have different aluminum alloy compositions, forming techniques (e.g, wrought or cast), and/or thicknesses.

While hot cracking is a weld defect that may occur during laser welding of a wide variety of aluminum alloy compositions, it is more of a concern when at least one, or even all, of the aluminum alloy workpieces 12, 14 (and possibly 36) includes a 5XXX series, a 6XXX series, or a 7XXX series wrought aluminum alloy base layer. A 5XXX series aluminum alloy is a non-heat-treatable aluminum/magnesium alloy that typically includes between 0.2 wt % and 6.2 wt % magnesium along with other common alloy constituents such as chromium, copper, iron, lead, manganese, silicon, and zinc. A 6XXX series aluminum alloy is a heat-treatable (generally by precipitation hardening) aluminum/magnesium/silicon alloy that typically includes between 0.2 wt % and 3.0 wt % magnesium and 0.2 wt % and 1.8 wt % silicon along with other common alloy constituents such as bismuth, chromium, copper, iron, lead, manganese, tin, and zinc. A 7XXX series aluminum alloy is a heat-treatable (generally by precipitation hardening) aluminum/zinc alloy that typically includes between 0.8 wt % and 12 wt % zinc along with other common alloy constituents such as silicon, iron, copper, manganese, magnesium, chromium, and titanium. A few specific examples of 5XXX series, 6XXX series, and 7XXX series aluminum alloys that are often subjected to laser welding in a variety of contexts in multiple industries are AA5754, AA5182, AA6111, AA6022, AA7003, and AA7055.

Referring back to FIGS. 1-2, the conventional laser welding apparatus 18 includes a laser optic head 48 and a robot 50 that carries the laser optic welding head 48. The laser optic welding head 48, which is coupled to a beam generator 52 by a fiber optic cable 54, directs the transmission of the laser beam 24 at the accessible top surface 20 of the workpiece stack-up assembly 10 (also the outer surface 26 of the first aluminum alloy workpiece 12). The focused laser beam 24 impinges the accessible top surface 20 at an impingement point or beam spot 56, which is the sectional area of the laser beam 24 at plane oriented along the accessible top surface 20 of the stack-up assembly 10. The laser beam 24 is preferably a solid-state laser beam that operates with a wavelength in the near-infrared range (700 nm to 1400 nm) of the electromagnetic spectrum and is able to deliver power at a level of 0.3 kW to 50 kW. Such a power level capability is sufficient attain the power density needed to vaporize the aluminum alloy workpieces 12, 14 (and possibly 36) beneath the impingement point 56 to produce a keyhole. Some examples of suitable solid-state laser beams include a fiber laser beam, a disk laser beam, and a direct diode laser beam. Laser generators that can generate each of those types of lasers as well as other variations are commercially available.

The laser optic welding head 48 includes a body 58 that houses a collimator 60 and a focusing element 62, as shown in FIG. 2. An end 64 of the fiber optic cable 54 is received in the body 58 and delivers a diverging conical laser beam 66 that originates in the laser beam generator 52 where the gain medium/media is present along with other associated laser components. The diverging conical laser beam 66 is transformed by the collimator 60 into a collimated laser beam 68 having a constant beam diameter. The collimator 60 may be a curved lens such as a parabolic or spherical lens through which the diverging conical laser beam 66 can pass. After departing the collimator 60, the collimated laser beam 68 is focused by the focusing element 62 into the laser beam 24 that is transmitted by the laser optic welding head 48 and impinges the accessible top surface 20 of the workpiece stack-up assembly 10. The focusing element 62 narrows the beam diameter of the laser beam 24 to a focal point 70 that preferably has a diameter ranging from 0.1 mm to 8 mm and a focal length 72 that ranges from 50 mm to 350 mm. As shown here in FIG. 2, the focal length 72 of the laser beam 24 is the distance between the focusing element 62 where beam narrowing is initiated and the focal point 70 of the laser beam 24. Like the collimator 60, the focusing element 62 may be curved lens such as a parabolic or spherical lens through which the collimated laser beam 68 can pass.

The laser beam 24 exits laser optic welding head 48 after interacting with the focusing element 62 and propagates forward along a longitudinal beam axis 74. When the laser optic welding head 48 is operational and the laser beam 24 is being trained on the workpiece stack-up assembly 10, cooling functionality installed in the welding head 48 may be initiated to help ensure the collimator 60 and the focusing element 62 do not overheat. The laser optic welding head 48 may also include visual monitoring equipment (not shown) having a line of sight down the longitudinal beam axis 74 of the laser beam 24 as well as other associated components and equipment such as a shield gas nozzle that can direct a flow of inert gas, such as argon or helium, at the impingement point 56 of the laser beam 24 and the accessible top surface 20 of the workpiece stack-up assembly 10. The laser optic welding head 48 shown schematically in FIGS. 1-2 and described above, as well as other design variations not specifically mentioned, are commercially available from a variety of sources. Some notable suppliers of laser optic welding heads and related laser system equipment for use with the conventional laser welding apparatus 18 include HIGHYAG (Kleinmachnow, Germany) and TRUMPF Inc. (Connecticut, USA).

The robot 50 is operable to move the laser optic welding head 48 within the space above the workpiece stack-up assembly 10 in order to advance the laser beam 24 relative to the accessible top surface 20 of the stack-up assembly 10 within the welding region 16. In particular, the robot 50 includes a robot arm 76 and a base 78. One end 80 of the robot arm 76 is connected to the base 78 and an opposite free end 82 of the arm 70 includes a mounting feature 84 that connects to and supports the laser optic welding head 48. The base 78 and the robot arm 76 are constructed with rotary, swivel, hinge, and/or other types of junctions that permit precise and programmable robotic movement of the laser optic welding head 48 relative to the workpiece stack-up assembly 10 with the aid of computer-implemented control systems. And because the longitudinal beam axis 74 of the laser beam 24 being transmitted from the laser optic welding head 48 is fixed relative to the welding head 48, the advancement of the laser beam 24 and, thus, the advancement of the impingement point 56 of the laser beam 24, relative to the accessible top surface 20 of the stack-up assembly 10 along a desired path is practiced by moving the welding head 48 via the robot 50 in a corresponding manner. As such, the travel speed of the laser beam 24 along the accessible top surface 20 of the workpiece stack-up assembly 10 is equal to the speed at which the laser optic welding head 48 is being robotically moved in through the space above the accessible top surface 20. The implemented travel speed of the laser beam 24 for conventional laser welding of aluminum alloys usually falls somewhere between 0.2 m/min and 10 m/min.

The conventional laser welding apparatus 18 may also include a clamping fixture 86 and/or a roller wheel 88, as shown best in FIG. 2, to provide further hot-cracking counter measures in addition to selectively limiting the line energy of the laser beam 24 as will be described in further detail below. The clamping fixture 86 includes a back support 90 in the form of a plate or anvil and one or more clamps 92. The back support 90 and the clamp(s) 92 are constructed to constrain a terminal end 94 of the first aluminum alloy workpiece 12 against movement away from the second aluminum alloy workpiece 14 so as to help protect the welding region 16 against out-of-plane thermal distortion of the aluminum alloy workpieces 12, 14 (and possibly 36). In that regard, the back support 90 is positioned to support the bottom surface 22 of the workpiece stack-up assembly 10 directly beneath the terminal end 94 of the first aluminum alloy workpiece 12, and the one or more clamps 92 are positioned to apply a downward force to the terminal end 94 of the first aluminum alloy workpiece 12 to effectively hold the aluminum alloy workpieces 12, 14 (and possibly 36) together along the top perimeter edge of the welding region 16. Each of the one or more clamps 92 is preferably a spot clamp tool that includes a pad or knob as the workpiece-engaging portion, or it may be a line clamp tool that includes an elongated bar or block as the workpiece-engaging portion.

The roller wheel 88 includes a disc 96 having a rolling circumferential edge 98. The disc 96 is rotatably supported on a shaft 100 and is angled away from the laser optic welding head 48 at an angle of 0° to 45°. The shaft 100 that supports the disc 96 is interconnected to an air cylinder 102 which, in turn, is interconnected to the body 58 of the laser optic welding head 48. The air cylinder 102 is operable to downwardly bias the rolling circumferential edge 98 of the disc 96 against the accessible top surface 20 of the workpiece stack-up 10 a short distance, e.g., 0.5 mm to 5 mm, away from the impingement point 56 of the laser beam 24 when the laser beam 24 is being transmitted into the stack-up assembly 10. In this way, the robotic movement of the laser optic welding head 48 not only serves to guide and advance the laser beam 24 relative to the accessible top surface 20 of the workpiece stack-up assembly 10, but it also serves to roll the disc 96 on its rolling circumferential edge 98 alongside the laser beam 24 while applying downward pressure to the accessible top surface 20 through the portion of the rolling circumferential edge 98 that contacts the top surface 20. The roller wheel 88 thus applies a rolling compressive force that coincides with the advancement of the impingement point 54 of the laser beam 24 to help protect against out-of-plane thermal distortion of the aluminum alloy workpieces 12, 14 (and possibly 36) on an inward side of the laser beam 24.

The conventional laser welding apparatus 18 can be used to laser weld the two or more aluminum alloy workpieces 12, 14 (and possibly 36) together within the welding region 16. Referring now to FIGS. 1-3 and 5-6, the practice of conventional laser welding will be discussed below and illustrated in connection with the embodiment of the workpiece stack-up assembly 10 that includes only the first and second aluminum alloy workpieces 12, 14. The same approach is equally applicable to the embodiment of the workpiece stack-up assembly 10 that includes the first, second, and third overlapping aluminum alloy workpieces 12, 14, 36, as shown, for example, in FIG. 4, including the capacity to mitigate or altogether eliminate the occurrence of hot-cracking in the same way. Moreover, although the clamping fixture 86 and the roller wheel 88 are depicted in FIGS. 1-2, those components of the conventional laser welding apparatus 18 have been omitted from FIGS. 5-6 for the sake of clarity. Indeed, each of the clamping fixture 86 and a roller wheel 88 are optional components that, while helpful in contributing to the mitigation of hot-cracking, are not necessary to the practice of the disclosed laser welding method.

Figure 5:
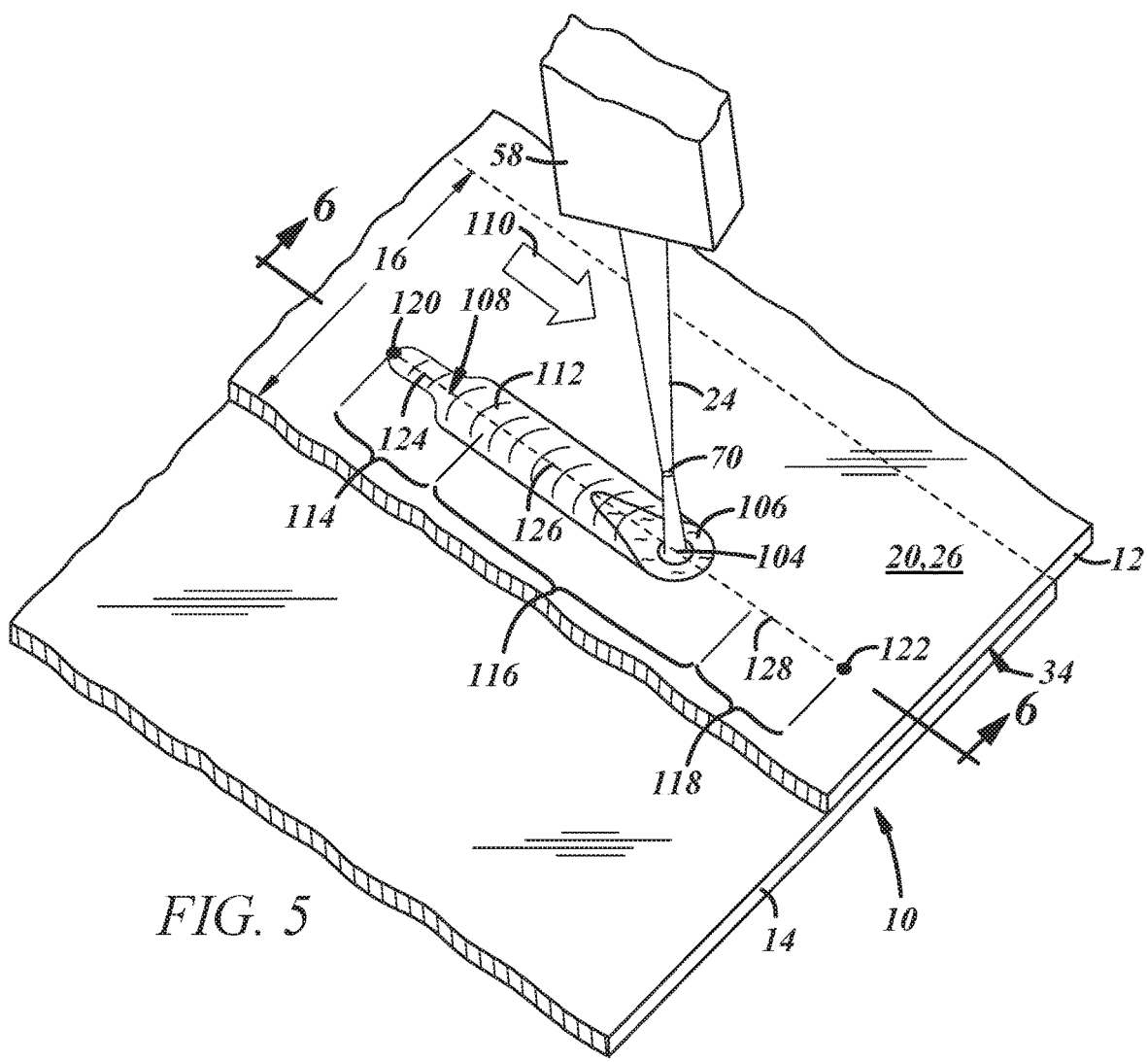
FIG. 5 is an elevated perspective view of a portion of the laser optic welding head and the accessible top surface of the workpiece stack-up assembly during formation of a laser weld joint in which the laser beam emanating from the laser optic welding head is being advanced relative to the accessible top surface along a weld path.
Figure 6:
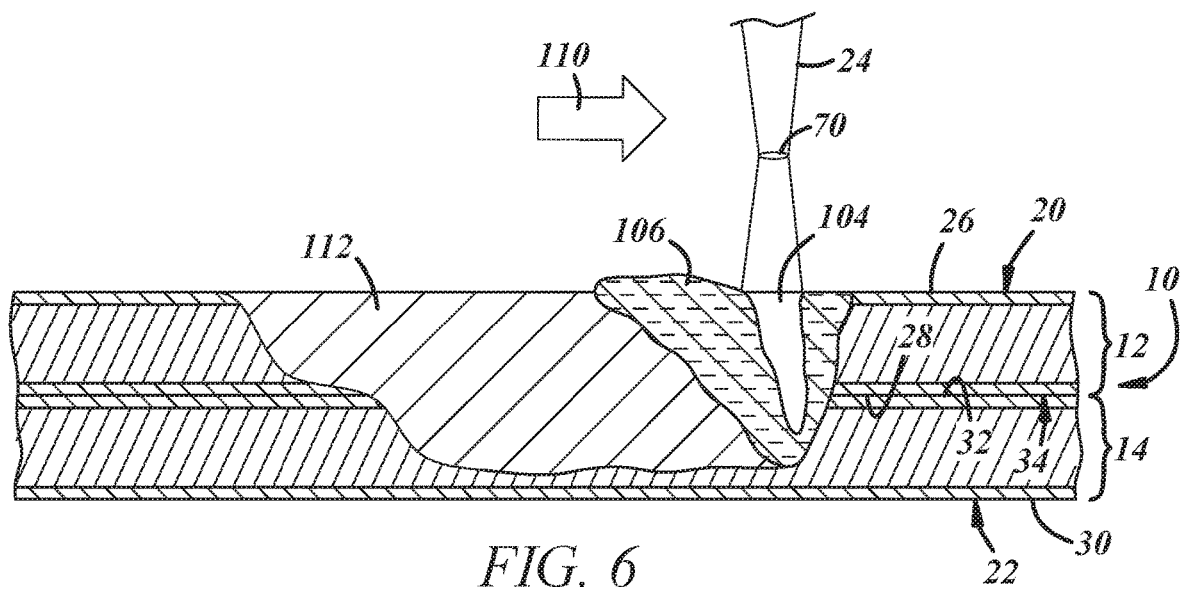
FIG. 6 is a cross-sectional view of the workpiece stack-up assembly taken along section lines 5-5.

Referring now specifically to FIGS. 5-6, the laser beam 24 is transmitted by the laser optic welding head 48 into the workpiece stack-up assembly 10 such that the laser beam 24 impinges the accessible top surface 20 of the workpiece stack-up assembly 10. The heat generated from absorption of the focused energy of the laser beam 24 initiates melting of the first and second aluminum alloy workpieces 12, 14 beneath the impingement point 56 to form a keyhole 104 and a surrounding molten aluminum alloy weld pool 106. The keyhole 104 and the molten aluminum alloy weld pool 106 extend from the accessible top surface 20 towards the bottom surface 22 of the workpiece stack-up assembly 10 and traverse the faying interface 34. The keyhole 104 and the molten aluminum alloy weld pool 106 may fully or partially penetrate the workpiece stack-up assembly 10 depending on a variety of factors. In a preferred embodiment, the keyhole 104 and the molten aluminum alloy weld pool 106 traverse the faying interface 34 but does not breach through the bottom surface 22 of the workpiece stack-up assembly 10. In those instances in which the workpiece stack-up assembly 10 includes the additional third aluminum alloy workpiece 36, the same basic characteristics of the keyhole 104 and the molten aluminum alloy weld pool 106 apply albeit with the added understanding that the keyhole 104 and the molten aluminum alloy weld pool 106 traverse each of the first and second faying interfaces 44, 46.

After the keyhole 104 and the molten aluminum alloy weld pool 106 are formed, the laser beam 24 is advanced relative to the accessible top surface 20 of the workpiece stack-up assembly 10 along a predefined weld path 108, such as along the linear seam depicted here in FIG. 5, in a forward welding direction 110. Such advancement of the laser beam 24 translates the keyhole 104 and the surrounding molten aluminum alloy weld pool 106 along a corresponding route within the workpiece stack-up assembly 10 and causes the penetrating molten aluminum alloy weld pool 106 to flow around and elongate behind the impingement point 56 within the workpiece stack-up 10 in the wake of the progressing laser beam 24. The penetrating molten aluminum alloy material quickly solidifies into resolidified coalesced aluminum alloy material. Once the laser beam 24 has finished tracing the weld path 108, the transmission of the laser beam 24 into the workpiece stack-up assembly 10 is halted. The resultant collective resolidified coalesced aluminum alloy material produced by advancement of the laser beam 24 along the weld path 108 constitutes a laser weld joint 112 that fusion welds the first and second aluminum alloy workpieces 12, 14 (and the third aluminum alloy workpiece 36 if present) together.

The advancement of the laser beam 24 along the weld path 108 can be broken down into three stages: (1) an initial stage 114; (2) an intermediate stage 116; and (3) a final stage 118. During the initial stage 114, the laser beam 24 is initially transmitted into the workpiece stack-up assembly 10 at a start point 120 of the weld path 108 and the travel speed of the laser beam 24 is accelerated in the forward welding direction 110 up to a target travel speed by robotically speeding up movement of the laser optic welding head 48. In the intermediate stage 116, both the power level of the laser beam 24 and the travel speed of the laser beam 24 are maintained at their respective target values as the laser beam 24 is being advanced along the weld path 108. And, lastly, during the final stage, the travel speed of the laser beam 24 is decelerated in the forward welding direction 110 from the target travel speed by robotically slowing movement of the laser optic welding head 48 and the transmission of the laser beam 24 into the workpiece stack-up assembly 10 is halted at stop point 122 of the weld path 108. The target travel speed and the target power level of the laser beam 24 refer to the programed, intended operating values that are sought to be attained for those two beam parameters during laser conventional welding. These values are normally input by a user into a weld control program that synchronously controls the operation of the robot 40 and the laser optic welding head 48.

Each of the initial stage 114, the intermediate stage 116, and the final stage 118 of laser beam advancement along the weld path 108 respectively corresponds to a travel distance covering a beginning portion 124, a middle portion 126, and an ending portion 128 of the weld path 108 and the resultant laser weld joint 112. That is, the beginning portion 124 of the weld path 108, which extends from the start point 120 towards the end point 122, is the section of the overall weld path 108 over which the laser beam 24 is advanced during the initial stage 114. Likewise, the ending portion 128 of the weld path 108, which extends from the stop point 122 towards the start point 120, is the section of the overall weld path 108 over which the laser beam 24 is advanced during the final stage 118. The middle portion 126 of the weld path 108 is located between the beginning and ending portions 124, 128 and is the section of the overall weld path 108 over which the laser beam 24 is advanced during the intermediate stage 116. Quantitatively speaking, in many instances, each of the initial and final stages 114, 118 of laser beam advancement along the weld path 108 usually lasts anywhere from 0.3 seconds to 0.7 seconds, while the intermediate stage 116 lasts anywhere from 1 second to 200 seconds. The beginning and ending portions 124, 128 of the weld path 108, in turn, may cover distances along the weld path 108 of 0.1 mm to 15 mm, while the middle portion 126 may cover a distance of 1 mm to 20 m, depending on the target travel speed of the laser beam 24.

As previously stated, the issue of hot-cracking has traditionally been most prevalent within the beginning and ending portions 124, 128 of the weld path 108 (and thus the laser weld joint 112). The increased susceptibility to hot-cracking is believed to be caused by excess line energy into the workpiece stack-up assembly 10 during the initial and final stages 114, 118 of laser beam advancement along the weld path 108. The term "line energy" refers to the ratio of the power level of the laser beam 24 and the travel speed of the laser beam 24 at any given time as represented by the following equation: line energy (J/m)=laser beam power level (W)/laser beam travel speed (m/s), or $E_L=P_L/S_L$. The line energy of the laser beam 24 has a tendency to spike during the initial and final stages 114, 118 of laser beam advancement along the weld path 108 because the transmission of the laser beam 24 can be initiated at or halted from its target power level almost instantaneously while the robot 50 is somewhat slower to respond in accelerating/decelerating the movement of the laser optic welding head 48 to thereby accelerate/decelerate the travel speed of the laser beam 24 up to or down from its target travel speed. The locally high heat input attributed to the excess line energy causes excessive fusion of the first and second aluminum alloy workpieces 12, 14 (and the third aluminum alloy workpiece 36 if present) at the beginning and ending portions 124, 128 of the weld path 108 and creates a cradle or pear-shaped bulbous anomaly within the laser weld joint 112 that encourages hot-cracking.

The presently disclosed method seeks to alleviate the hot-cracking problem at the beginning and/or ending portions 124, 128 of the weld path 108. To do so, the power level of the laser beam 24 is controlled to limit the line energy of the laser beam 24 during the initial and/or final stages 114, 118 of laser beam advancement along the weld path 108 to being no greater than 10% above the line energy of the laser beam 24 during the intermediate stage 116 of laser beam advancement along the weld path 108. The line energy of the laser beam 24 during the intermediate stage 116, which equates to when the laser beam 24 is being maintained at its target power level and target travel speed, usually falls between 24,000 J/m and 180,000 J/m, with the target power level preferably being in the range of 2 kW and 6 kW and the target travel speed preferably being in the range of 2 m/min and 5 m/min. The line energy of the laser beam 24 can be limited during the initial and/or final stages 114, 118 of laser beam advancement along the weld path 108, and preferably during both stages 114, 118, by controlling the power level of the laser beam 24 to compensate for the slower response time of the laser optic welding head 48 and its ability to accelerate/decelerate the travel speed of the laser beam 24. The line energy of the laser beam 24 during each of the initial and final stages 114, 118 is preferably equal to or less than the line energy of the laser beam 24 during the intermediate stage 116.

As explained below with specific reference to the embodiments depicted in FIGS. 7-14, the power level of the laser beam 24 may be controlled during the initial and/or final stages 114, 118 of laser beam advancement along the weld path 108 by (1) increasing the power level at a controlled rate up to the target power level while the travel speed of the laser beam 24 is being accelerated up to the target travel speed (initial stage) and/or (2) decreasing the power level at a controlled rate down from the target power level (final stage) while the travel speed of the laser beam 24 is being decelerated down from the target travel speed. Additionally, regarding the initial stage 114, the initial transmission of the laser beam 24 into the workpiece stack-up assembly 10 can be delayed until after the laser optic welding head 48 has begun accelerating from a rest position in order to avoid a locally high heat input into the workpiece stack-up assembly 10 at the start point 120 of the weld path 108. Likewise, regarding the final stage 118, the transmission of the laser beam 24 into the workpiece stack-up assembly 10 can be halted before the laser optic welding head 48 has finished decelerating to a rest position in order to avoid a locally high heat input into the workpiece stack-up assembly 10 at the stop point 122 of the weld path 108.

The laser weld joint 112 may assume a certain particular structure on account of controlling the power level of the laser beam 24 to limit the line energy of the laser beam 24 during the initial and/or final stages 114, 118 of laser beam advancement along the weld path 108 as described above. Indeed, as shown in FIGS. 5-6, the resolidified coalesced aluminum alloy material that constitutes the weld joint 112 may be narrower at the accessible top surface 20 of the workpiece stack-up assembly 10 within the beginning and ending portions 124, 128 of the weld path 108 when compared against the middle portion 126 of the weld path 108. Additionally, the resolidified coalesced aluminum alloy material that constitutes the weld joint 112 may have an increasing penetration into the workpiece stack-up assembly 10 from the start point 120 of the weld path 108 to the middle portion 126 of the weld path 108, and may have a decreasing penetration into the workpiece stack-up assembly 10 from the middle portion 126 of the weld path 108 to the end point 122 of the weld path 108. These features of the weld joint 112 in the beginning and ending portions 124, 128 of the weld path 108 can be attributed to the lower energy absorption rate associated with limiting the line energy during the initial and/or final stages 114, 118 of laser beam advancement along the weld path 108.

Several specific implementations of controlling the power level of the laser beam 24 by increasing the power level at a controlled rate during the initial stage 114 and decreasing the power level at a controlled rate during the final stage 118 are graphically illustrated in FIGS. 7-9 and FIGS. 10-12, respectively. In each of those FIGS., the following process parameters are plotted against time: (1) the power level of the laser beam 24, (2) the speed of the laser optic welding head 48 relative to the accessible top surface 20 of the workpiece stack-up assembly 10 which also represents the travel speed of the laser beam 24 when the laser beam 24 is being transmitted into the stack-up assembly 10, and (3) the line energy of the laser beam 24. In the graphical illustrations of FIGS. 7-12, the power level of the laser beam 24 is identified by reference numeral 210, the speed of the forward movement of the laser optic welding head 48 (and the travel speed of the advancing laser beam 24 when the laser beam is being transmitted) is identified by reference numeral 212, and the line energy of the laser beam 24 is identified by reference numeral 214. Also in FIGS. 7-12, the target power level of the laser beam 24 is identified by reference numeral 210', the target travel speed of the laser beam 24 is identified by reference numeral 212', and the line energy of the laser beam 24 during the intermediate stage (when the laser beam 24 is maintained at its target power level 210' and travel speed 212') is identified by reference numeral 214'.

Figure 7:
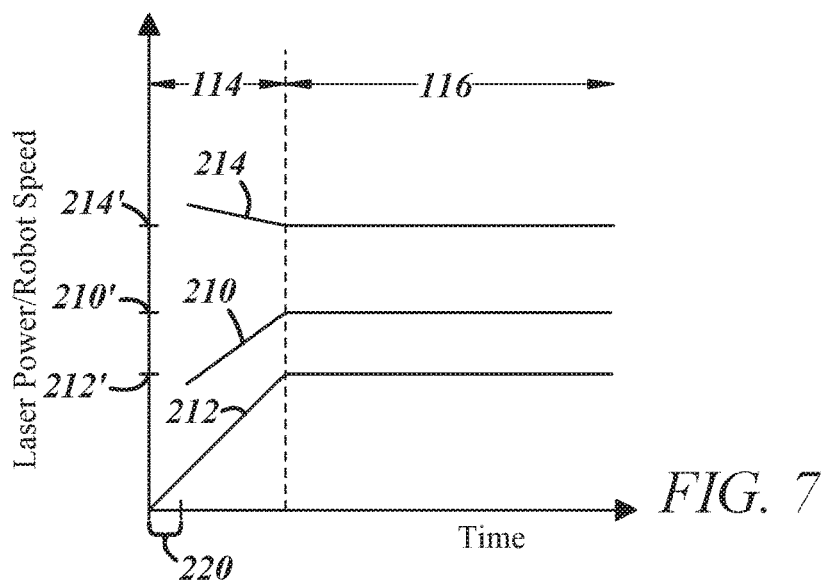
FIG. 7 is a graph illustrating the power level of the laser beam, the speed of the laser optic welding head (and thus the travel speed of the laser beam when the beam is being transmitted), and the line energy of the laser beam, each as a function of time, during the initial stage and the intermediate stage of laser beam advancement along the weld path using the conventional laser welding apparatus depicted in FIG. 1 according to one aspect of the present disclosure.
Figure 8:
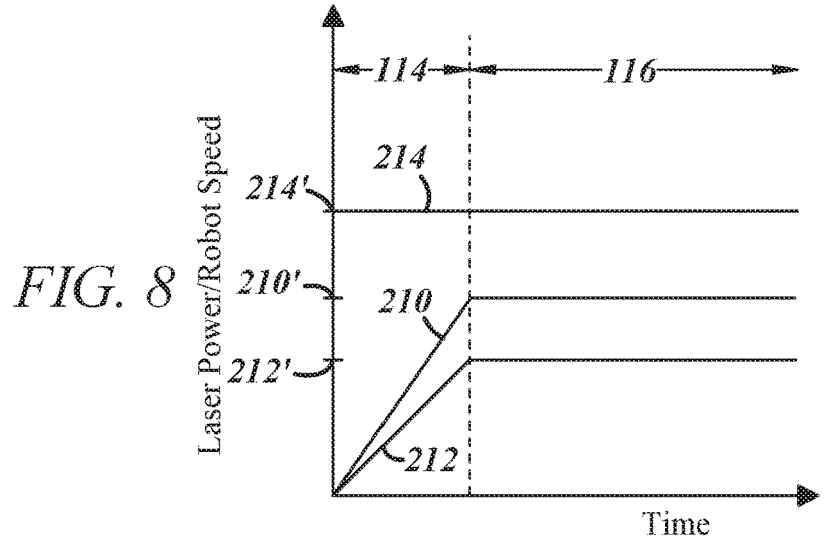
FIG. 8 is a graph illustrating the power level of the laser beam, the speed of the laser optic welding head (and thus the travel speed of the laser beam when the beam is being transmitted), and the line energy of the laser beam, each as a function of time, during the initial stage and the intermediate stage of laser beam advancement along the weld path using the conventional laser welding apparatus depicted in FIG. 1 according to another aspect of the present disclosure.
Figure 9:
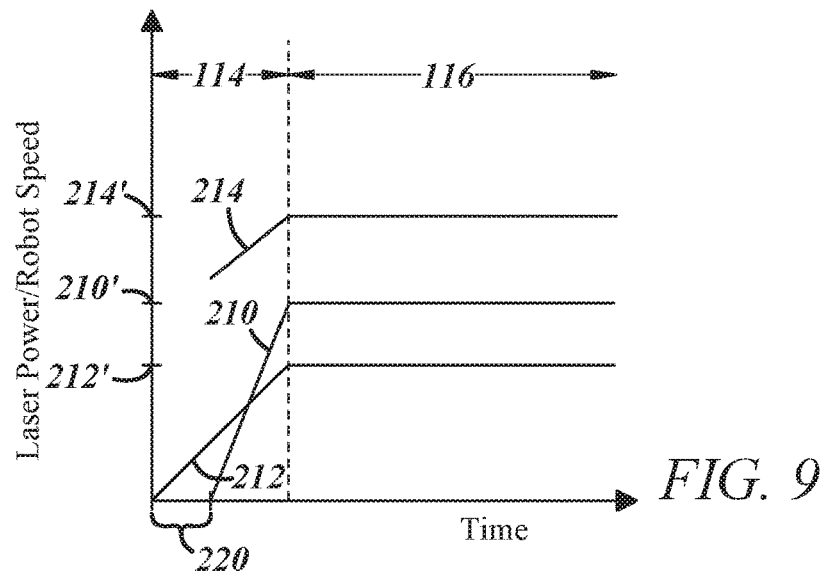
FIG. 9 is a graph illustrating the power level of the laser beam, the speed of the laser optic welding head (and thus the travel speed of the laser beam when the beam is being transmitted), and the line energy of the laser beam, each as a function of time, during the initial stage and the intermediate stage of laser beam advancement along the weld path using the conventional laser welding apparatus depicted in FIG. 1 according to yet another aspect of the present disclosure.

FIGS. 7-9 demonstrate how the power level 210 of the laser beam 24 can be controlled to limit the line energy 214 of the laser beam 24 during the initial stage 114 of laser beam advancement along the weld path 108. Referring now specifically to FIG. 7, the laser optic welding head 48 is accelerated forward from a rest position while the initial transmission of the laser beam 24 into the workpiece stack-up assembly 10 is momentarily delayed by time period 220 so that the speed 212 of the welding head 48 and thus the travel speed of the laser beam 24 is greater than zero when the laser beam 24 is initially transmitted at the start point 120 of the weld path 108. The initial transmission of the laser beam 24 may be delayed, for example, by 1 ms to 700 ms. Moreover, in this embodiment, the power level 210 of the laser beam 24 is initially transmitted into the workpiece stack-up assembly 10 at a non-zero power level which may be greater than 50% of the target power level 210'—as opposed to being initially transmitted at a very low level just above 0 kW—and is then increased at a controlled rate of 2.8 kW/s to 20 kW/s up to the target power level 210' while the travel speed 212 of the laser beam 24 is accelerated up to the target travel speed 212' at a rate of 170 m/min$^2$ to 1200 m/min$^2$. Under these conditions, the line energy 214 of the laser beam 24 over the course of the initial stage 114 is greater than the line energy 214' of the laser beam 24 during the intermediate stage 114. But, even at its highest value (i.e., at the initial transmission of the laser beam 24), the line energy 214 of the laser beam 24 is still not greater than 10% above the line energy 214' of the laser beam during the intermediate stage 116.

In FIG. 8, the laser beam 24 is initially transmitted into the workpiece stack-up assembly 10 at the same time that the laser optic welding head 48 begins to accelerate forward from a rest position. Here, the power level 210 of the laser beam 24 is very low, e.g., less than 0.05 kW, during initial transmission of the laser beam 24 at the start point 120 of the weld path 108 given the initially and correspondingly slow speed 212 of the welding head 48 and the laser beam 24 due to the inertial effects of moving the welding head 48 from rest. After the initial transmission of the laser beam 24, the power level 210 of the laser beam 24 is increased at a controlled rate of 2.8 kW/s to 20 kW/s up to the target power level 210' while the travel speed 212 of the laser beam 24 is accelerated up to the target travel speed 212' at a rate of 170 m/min$^2$ to 1200 m/min$^2$ over the same period of time. By increasing the power level 210 of the laser beam 24 while accelerating the travel speed 212 of the laser beam 24 over the course of the same time period, as shown here, the line energy 214 of the laser beam 24 during the initial stage 114 can be made equal to and constant with the line energy 214' of the laser beam 24 during the intermediate stage 116 of laser beam advancement along the weld path 108.

Turning now to FIG. 9, which is similar to FIG. 7, the laser optic welding head 48 is accelerated forward from a rest position while the initial transmission of the laser beam 24 into the workpiece stack-up assembly 10 is momentarily delayed by time period 220 so that the speed 212 of the welding head 48 and thus the travel speed of the laser beam 24 is greater than zero when the laser beam 24 is initially transmitted at the start point 120 of the weld path 108. The initial transmission of the laser beam 24 may be delayed, like before, by 1 ms to 700 ms. After the initial transmission of the laser beam 24, the power level 210 of the laser beam 24 is increased at a controlled rate of 2.8 kW/s to 20 kW/s up to the target power level 210' while the travel speed 212 of the laser beam 24 is accelerated up to the target travel speed 212' at a rate of 170 m/min$^2$ to 1200 m/min$^2$. One difference in this embodiment, however, compared to the embodiment of FIG. 7, is that the power level 210 of the laser beam 24 is initially transmitted into the workpiece stack-up assembly 10 at a low level, e.g., less than 0.05 kW, instead of at a non-zero power level which may, as shown here, be greater than 50% of the target power level 210'. In so doing, the line energy 214 of the laser beam 24 during the initial stage 114 is downwardly shifted, compared to FIG. 7, such that the line energy 214 of the laser beam 24 over the course of the initial stage 114 is less than the line energy 214' of the laser beam 24 during the intermediate stage 116 of laser beam advancement along the weld path 108.

Figure 10:
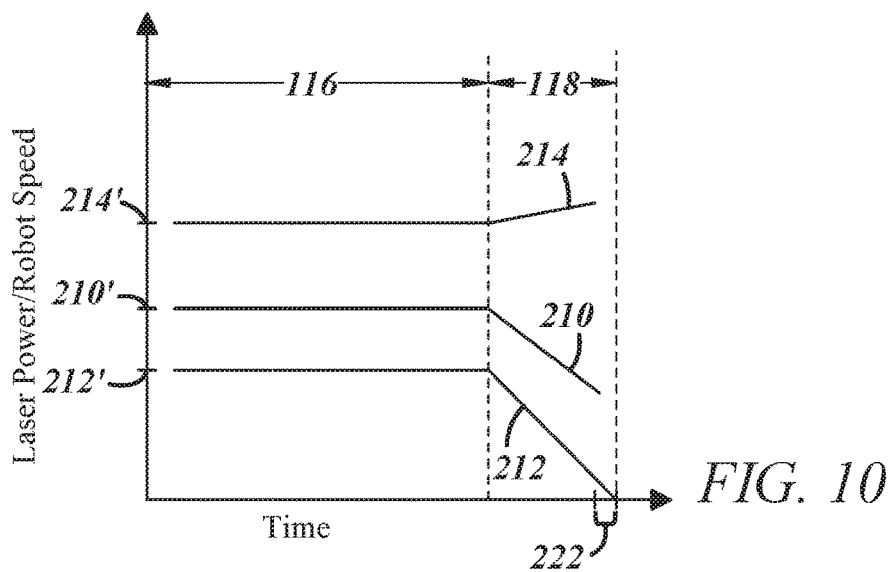
FIG. 10 is a graph illustrating the power level of the laser beam, the speed of the laser optic welding head (and thus the travel speed of the laser beam when the beam is being transmitted), and the line energy of the laser beam, each as a function of time, during the intermediate stage and the final stage of laser beam advancement along the weld path using the conventional laser welding apparatus depicted in FIG. 1 according to one aspect of the present disclosure.
Figure 11:
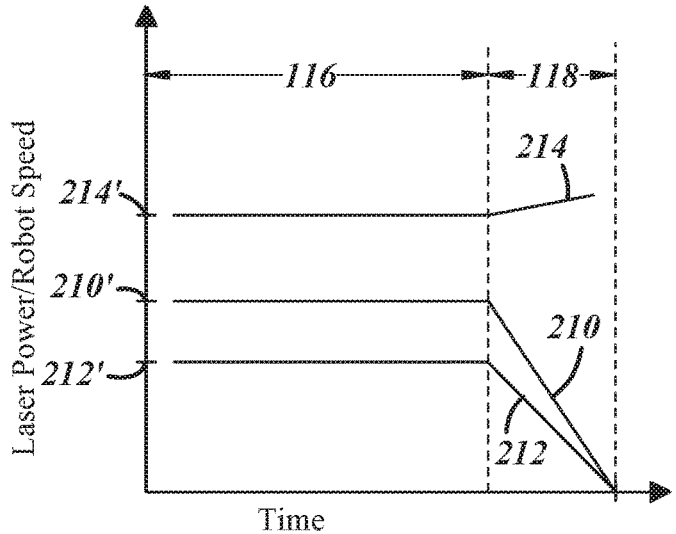
FIG. 11 is a graph illustrating the power level of the laser beam, the speed of the laser optic welding head (and thus the travel speed of the laser beam when the beam is being transmitted), and the line energy of the laser beam, each as a function of time, during the intermediate stage and the final stage of laser beam advancement along the weld path using the conventional laser welding apparatus depicted in FIG. 1 according to another aspect of the present disclosure.
Figure 12:
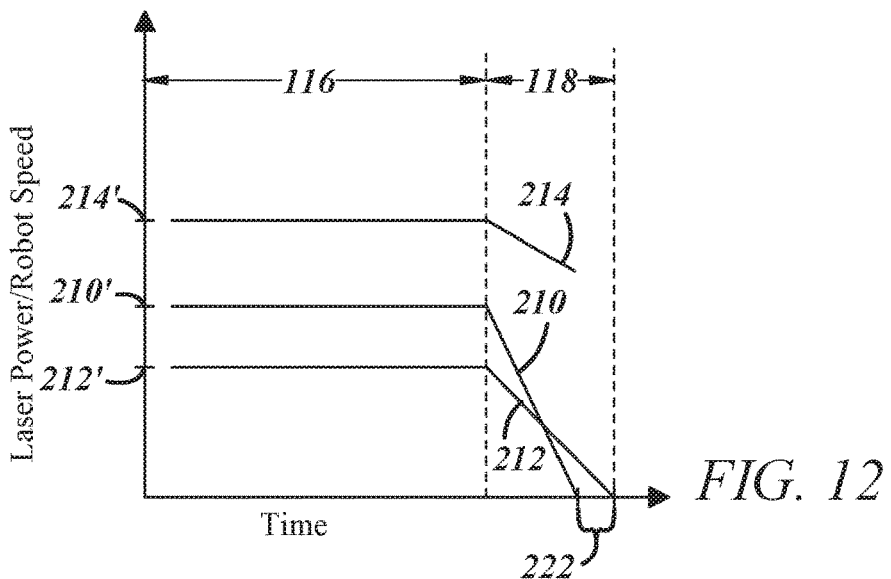
FIG. 12 is a graph illustrating the power level of the laser beam, the speed of the laser optic welding head (and thus the travel speed of the laser beam when the beam is being transmitted), and the line energy of the laser beam, each as a function of time, during the intermediate stage and the final stage of laser beam advancement along the weld path using the conventional laser welding apparatus depicted in FIG. 1 according to yet another aspect of the present disclosure.

FIGS. 10-12 demonstrate how the power level 210 of the laser beam 24 can be controlled to limit the line energy 214 of the laser beam 24 during the final stage 118 of laser beam advancement along the weld path 108. Referring now specifically to FIG. 10, the speed 212 of the laser optic welding head 48 and thus the travel speed of the laser beam 24 is decelerated from the target travel speed 212' while the power level 210 of the laser beam 24 is decreased from the target power level 210' at a controlled rate. Also, as shown, the transmission of the laser beam 24 is halted before the welding head 48 is finished decelerating to a rest position such that the speed 212 of the welding head 48 and thus the travel speed of the laser beam 24 is greater than zero at the stop point 122 of the weld path 108. The transmission of the laser beam 24 may be halted early to leave a time period 222 that may last from 1 ms to 700 ms during which time the laser optic welding head 48 continues to decelerate to rest. The travel speed 212 of the laser beam 24 may be decelerated at a rate of 170 m/min$^2$ to 1200 m/min$^2$ while the power level 210 of the laser beam 24 is decreased at a controlled rate of 2.8 kW/s to 20 kW/s. The transmission of the laser beam 24, moreover, may be halted while the power level 210 of the laser beam 24 is still above 50% of the target power level 210', which leads to an increase in the line energy 214 over the course of the final stage 118 of laser beam advancement along the weld path 108 compared to the intermediate stage 116. The increase in the line energy 214 of the laser beam 24 during the final stage 118 may be implemented to compensate for the reduced energy absorption rate of the laser beam 24 in a restrained way such that the highest line energy value of the laser beam 24 is still not greater than 10% above the line energy 214' of the laser beam 24 during the intermediate stage 116.

In FIG. 11, the speed 212 of the laser optic welding head 48 and thus the travel speed of the laser beam 24 is decelerated from the target travel speed 212' while, over the same period of time, the power level 210 of the laser beam 24 is decreased at a controlled rate from the target power level 210' down to a low level, e.g., less than 0.05 kW, before transmission of the laser beam 24 is halted. In particular, the speed 212 of the laser optic welding head 48 and thus the travel speed 212 of the laser beam 24 is decelerated at a rate of 170 m/min$^2$ to 1200 m/min$^2$ while the power level 212 of the laser beam 24 is decreased at controlled rate of 2.8 kW/s to 20 kW/s. In this way, at the stop point 122 of the weld path 108, the laser optic welding head 48 and the laser beam 24 are brought to rest while the transmission of the laser beam 24 is simultaneously halted. By decelerating the speed 212 of the laser optic welding head 48 and thus the travel speed of the laser beam 24 while decreasing the power level 210 of the laser beam 24 over the course of the same time period, as shown here, the line energy 214 of the laser beam 24 during the final stage 118 can be made equal to and constant with the line energy 214' of the laser beam 24 during the intermediate stage 116 of laser beam advancement along the weld path 108.

Referring now to FIG. 12, which is similar to FIG. 10, the speed 212 of the laser optic welding head 48 and thus the travel speed of the laser beam 24 is decelerated from the target travel speed 212' while the power level 210 of the laser beam 24 is decreased from the target power level 210' at a controlled rate. And, like before, the transmission of the laser beam 24 is halted before the welding head 48 is finished decelerating to a rest position to leave a time period 222, which may last from 1 ms to 700 ms, in which the laser optic welding head 48 continues to decelerate to rest after transmission of the laser beam 24 is halted. The speed 212 of the laser optic welding head 48 and thus the travel speed of the laser beam 24 may be decelerated at a rate of 170 m/min$^2$ to 120 m/min$^2$ while the power level 210 of the laser beam 24 is decreased at a controlled rate of 2.8 kW/s to 20 kW/s. But, unlike FIG. 10, the power level 210 here is decreased at a controlled rate down to a low level, e.g., less than 0.05 kW, before transmission of the laser beam 24 is halted. As a result, the line energy 214 of the laser beam 24 during the final stage 118 is downwardly shifted, compared to FIG. 10, such that the line energy 214 of the laser beam 24 over the course of the final stage 118 is less than the line energy 214' of the laser beam 24 during the intermediate stage 116.

The laser power control schemes depicted in FIGS. 7-9 and FIGS. 10-12 disclose several examples of how to limit the line energy of the laser beam 24 during the initial stage 114 (FIGS. 7-9) and the final stage 118 (FIGS. 10-12) of laser beam advancement along the weld path 108 in an effort to avoid excessive fusion within the workpiece stack-up assembly 10 in beginning and ending portions 124, 128 of the weld path 108. To carry out the disclosed method, the power level may be controlled only in the initial stage 114 of laser beam advancement along the weld path 108, only in the final stage 118 of laser beam advancement along the weld path 108, or during both the initial and final stages 114, 118 of laser beam advancement along the weld path 108. Any of the examples shown in FIGS. 7-9, plus others not shown, may be used to limit the line energy of the laser beam 24 during the initial stage 114, and any of the examples shown in FIGS. 10-12, plus others not shown, may be used to limit the line energy of the laser beam 24 during the final stage 118. And, of course, when intending to limit the line energy of the laser beam 24 in both the initial and final stages 114, 118, any one of the examples shown in FIGS. 7-9 may be combined with any one of the examples shown in FIGS. 10-12, as well as other variations not shown.

Figure 13:
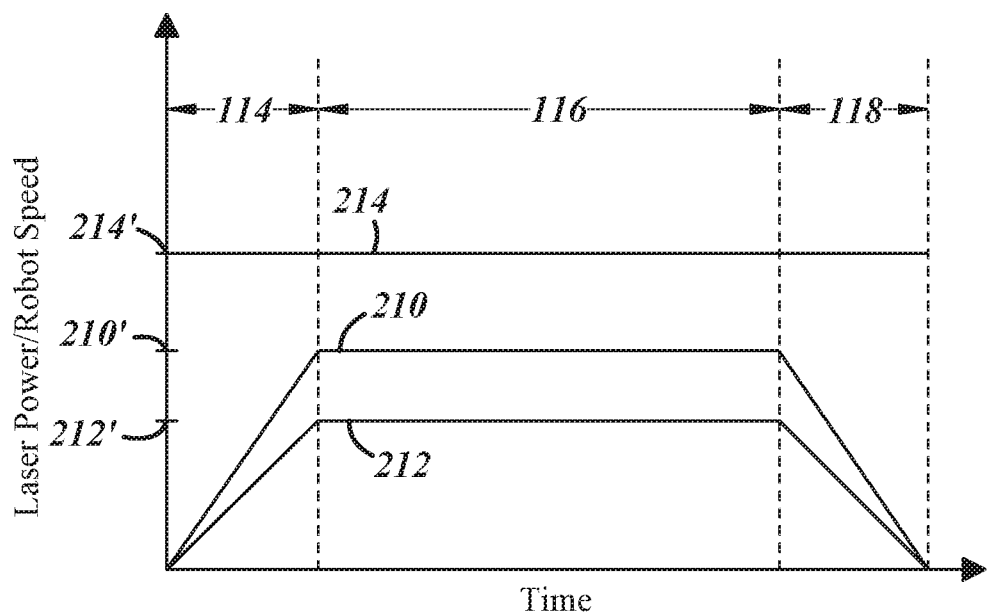
FIG. 13 is a graph illustrating the power level of the laser beam, the speed of the laser optic welding head (and thus the travel speed of the laser beam when the beam is being transmitted), and the line energy of the laser beam, each as a function of time, during the initial, intermediate, and final stages of laser beam advancement along the weld path using the conventional laser welding apparatus depicted in FIG. 1 according to one aspect of the present disclosure.
Figure 14:
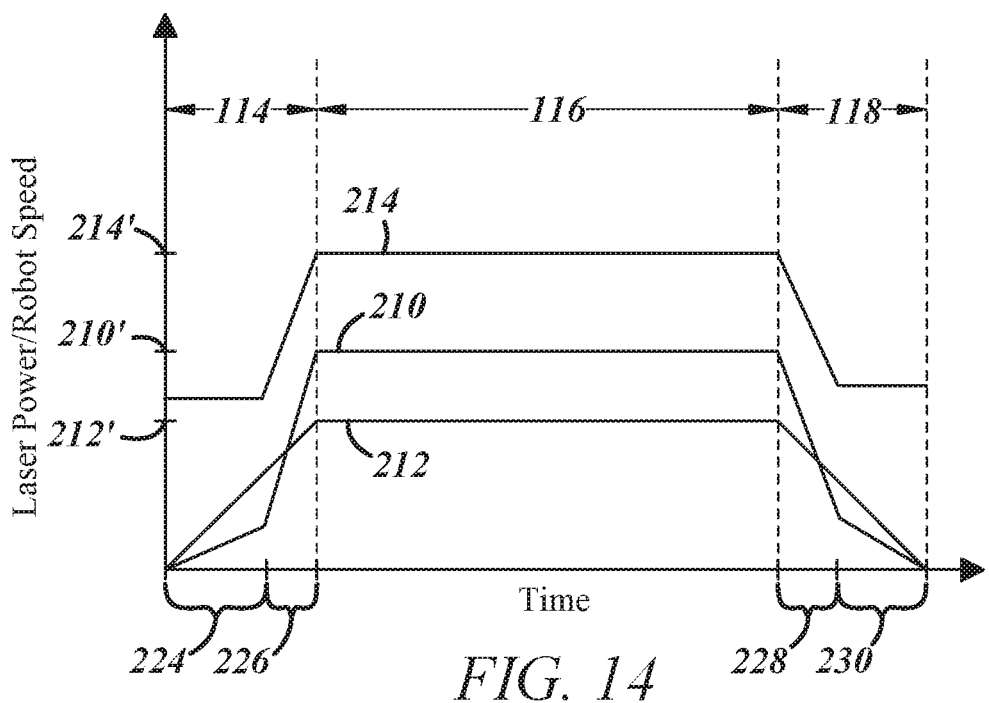
FIG. 14 is a graph illustrating the power level of the laser beam, the speed of the laser optic welding head (and thus the travel speed of the laser beam when the beam is being transmitted), and the line energy of the laser beam, each as a function of time, during the initial, intermediate, and final stages of laser beam advancement along the weld path using the conventional laser welding apparatus depicted in FIG. 1 according to another aspect of the present disclosure.

Referring now to FIGS. 13-14, for example, several embodiments are shown in which the power level of the laser beam 24 can be controlled to limit the line energy of the laser beam 24 during both the initial and final stages 114, 118 of laser beam advancement along the weld path 108. In FIG. 13, the example from FIG. 8 and the example from FIG. 11 are combined to limit the line energy of the laser beam 24 during the initial and final stages 114, 118. In this scenario, as described above, the power level 210 of the laser beam 24 is low, e.g., less than 0.05 kW, during initial transmission at the start point 120 of the weld path 108 and is then increased at a controlled rate up to the target power level 210' while, over the same period of time, the speed 212 of the laser optic welding head 48 is accelerated from rest to bring the corresponding travel speed of the laser beam 24 up to the target travel speed 212'. The power level 210 of the laser beam 24 and the travel speed 212 of the laser beam 24 are then maintained at their respective target power level 210' and target travel speed 212' throughout the intermediate stage 116. Eventually, at the end of the intermediate stage 116, the speed 212 of the laser optic welding head 48 and thus the travel speed of the laser beam 24 is decelerated from the target travel speed 212' while, over the same period of time, the power level 210 of the laser beam 24 is decreased at a controlled rate from the target power level 210' down to a low level, e.g., less than 0.05 kW, before the welding head 48 is brought to rest and the transmission of the laser beam 24 is simultaneously halted at the stop point 122 of the weld path 108.

FIG. 14 depicts yet another example of controlling the power level of the laser beam 24 to limit the line energy of the laser beam 24 during the both the initial and final stages 114, 118 of laser beam advancement along the weld path 108. In this instance, the laser beam 24 is initially transmitted into the workpiece stack-up assembly 10 at the same time that the laser optic welding head 48 begins to accelerate forward from a rest position. The power level 210 of the laser beam 24 is low, e.g., less than 0.05 kW, during initial transmission of the laser beam 24 at the start point 120 of the weld path 108. Next, while the speed 212 of the laser optic welding head 48 and thus the travel speed of the laser beam 24 is accelerated up to the target travel speed 212' at a rate of 170 m/min$^2$ to 1200 m/min$^2$, the power level 210 of the laser beam 24 is increased at a controlled rate of 2.8 kW/s to 20 kW/s nonlinearly over the initial stage 114. For example, the power level 210 may be increased at a slower increasing rate between 2.8 kW/s and 20 kW/s over a first period of time 224 followed by being increased at a faster increasing rate between 2.8 kW/s and 20 kW/s over a second period of time 226 until the power level 210 reaches the target power level 210'.

The power level 210 of the laser beam 24 and the travel speed 212 of the laser beam 24 are then maintained at their respective target power level 210' and target travel speed 212' throughout the intermediate stage 116. Eventually, at the end of the intermediate stage 116, the speed 212 of the laser optic welding head 48 and thus the travel speed of the laser beam is decelerated from the target travel speed 212' while, over the same period of time, the power level 210 of the laser beam 24 is decreased at a controlled rate of 2.8 kW/s to 20 kW/s nonlinearly over the final stage 118. For example, the power level 210 may be decreased at a faster decreasing rate between 2.8 kW/s and 20 kW/s over a third period of time 228 followed by being decreased at a slower decreasing rate between 2.8 kW/s and 20 kW/s over a fourth period of time 230 down to a low level, e.g., less than 0.05 kW, before the welding head 48 is brought to rest and the transmission of the laser beam 24 is simultaneously halted at the stop point 122 of the weld path 108. In this particular embodiment, the first period of time 224 may last from 1 ms to 700 ms, the second period of time 226 may last from 1 ms to 700 ms, the third period of time 228 may last from 1 ms to 700 ms, and the fourth period of time 230 may last from 1 ms to 700 ms.

The various embodiments of the presently disclosed method as set forth in FIGS. 7-14 demonstrate how to selectively control the line energy of the laser beam 24 during the initial and/or final stages 114, 118 of laser beam advancement along the weld path 108 so as to prevent excessive fusion of the workpiece stack-up assembly 10 at the beginning and/or ending portions 124, 128 of the weld path 108. While the line energy of the laser beam 24 may be controlled to be no greater than 10% above the line energy of the laser beam 24 attained in the intermediate stage 116 in order to accomplish the goal of preventing excessive aluminum workpiece fusion, in preferred embodiments the line energy during the initial and/or final stages 114, 118 of laser beam advancement along the weld path 108 is controlled to be equal to or less than the line energy of the laser beam 24 attained in the intermediate stage 116. By preventing excessive fusion, the formation of a cradle or pear-shaped bulbous anomaly within the laser weld joint 112 at the beginning and/or ending portions 124, 128 of the weld path 108 can be avoided which, in turn, helps protect those same portions of the weld joint 112 against hot-cracking, particularly when one or more of the aluminum alloy workpieces 12, 14 (and possibly 36) includes a 5XXX series, a 6XXX series, or a 7XXX series wrought aluminum alloy base layer.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of laser welding a workpiece stack-up assembly that includes at least two aluminum alloy workpieces, the method comprising:

providing a workpiece stack-up assembly that includes at least a first aluminum alloy workpiece and a second aluminum alloy workpiece that overlap one another to establish a faying interface between the workpieces, the first aluminum alloy workpiece providing an accessible top surface of the workpiece stack-up assembly;

transmitting a laser beam at the accessible top surface of the workpiece stack-up assembly to create a keyhole within the workpiece stack-up assembly and a molten aluminum alloy weld pool that surrounds the keyhole, the keyhole and the molten aluminum alloy weld pool traversing at least the faying interface established between the first and second aluminum alloy workpieces, the laser beam having a power level;

advancing the laser beam relative to the accessible top surface of the workpiece stack-up assembly to convey an impingement point of the laser beam along a weld path that includes a beginning portion and an ending portion so as to translate the keyhole and the surrounding molten aluminum alloy weld pool along a corresponding route within the workpiece stack-up assembly, the laser beam being advanced along the weld path at a travel speed and, further, the laser beam having a line energy, which is defined by the equation $E_L=P_L/S_L$, wherein $E_L$ is the line energy of the laser beam, $P_L$ is the power level of the laser beam, and $S_L$ is the travel speed of the laser beam; and controlling the power level of the laser beam during at least one of an initial stage or a final stage of advancing the laser beam along the weld path, the initial stage covering advancement of the laser beam along the beginning portion of the weld path and the final stage covering advancement of the laser beam along the ending portion of the weld path, wherein controlling the power level during at least one of the initial or final stages of advancing the laser beam along the weld path limits the line energy of the laser beam to being no greater than 10% above the line energy of the laser beam during an intermediate stage of advancing the laser beam along the weld path, the intermediate stage covering advancement of the laser beam along a middle portion of the weld path between the beginning and ending portions.

2. The method set forth in claim 1, wherein the first aluminum alloy workpiece has an outer surface and a first faying surface, and the second aluminum alloy workpiece has an outer surface and a second faying surface, the outer surface of the first aluminum alloy workpiece providing the accessible, top surface of the workpiece stack-up assembly and the outer surface of the second aluminum alloy workpiece providing a bottom surface of the workpiece stack-up assembly, and wherein the first faying surface of the first aluminum alloy workpiece and the second faying surface of the second aluminum alloy workpiece establish the faying interface.

3. The method set forth in claim 1, wherein the workpiece stack-up assembly further includes a third aluminum alloy workpiece that overlaps the second aluminum alloy workpiece, opposite the first aluminum alloy workpiece, to establish a second faying interface, the first aluminum alloy workpiece having an outer surface and a first faying surface, the third aluminum alloy workpiece having an outer surface and a fourth faying surface, and the second aluminum alloy workpiece having opposed second and third faying surfaces, the outer surface of the first aluminum alloy workpiece providing the accessible top surface of the workpiece stack-up assembly and the outer surface of the third aluminum alloy workpiece providing a bottom surface of the workpiece stack-up assembly, wherein the first faying surface of the first aluminum alloy workpiece and the second faying surface of the second aluminum alloy workpiece establish a first faying interface, wherein the third faying surface of the second aluminum alloy workpiece and the fourth faying surface of the third aluminum alloy workpiece establish the second faying interface, and wherein the keyhole and the molten aluminum alloy weld pool traverse both the first and second faying interfaces.

4. The method set forth in claim 1, wherein, during the intermediate stage of advancing the laser beam along the weld path, the power level of the laser beam is maintained at a target power level and the travel speed of the laser beam is maintained at a target travel speed.

5. The method set forth in claim 4, wherein the target power level is between 2 kW and 6 kW and the target travel speed is between 2 m/min and 5 m/min.

6. The method set forth in claim 4, wherein, during the initial stage of advancing the laser beam along the weld path, the laser beam is initially transmitted into the workpiece stack-up assembly and the power level of the laser beam is increased at a controlled rate up to the target power level while the travel speed of the laser beam along the weld path is accelerated up to the target travel speed.

7. The method set forth in claim 6, wherein the laser beam is initially transmitted into the workpiece stack-up assembly after a laser optic welding head that transmits the laser beam into the workpiece stack-up assembly has begun accelerating forward from a rest position.

8. The method set forth in claim 4, wherein, during the final stage of advancing the laser beam along the weld path, the power level of the laser beam is decreased at a controlled rate down from the target power level while the travel speed of the laser beam along the weld path is decelerated from the target travel speed, and transmission of the laser beam into the workpiece stack-up assembly is halted.

9. The method set forth in claim 8, wherein the transmission of the laser beam into the workpiece stack-up assembly is halted before a laser optic welding head that transmits the laser beam into the workpiece stack-up assembly has finished decelerating to a rest position.

10. The method set forth in claim 1, wherein the initial stage of advancing the laser beam along the weld path lasts from 0.3 seconds to 0.7 seconds, wherein the intermediate stage of advancing the laser beam along the weld path lasts from 1 second to 200 seconds, and wherein the final stage of advancing the laser beam along the weld path lasts from 0.3 seconds to 0.7 seconds.

11. The method set forth in claim 1, wherein the line energy of the laser beam during the intermediate stage of advancing the laser beam along the weld path is between 24,000 J/m and 180,000 J/m.

12. The method set forth in claim 1, wherein the line energy of the laser beam during at least one of the initial stage or the final stage of advancing the laser beam along the weld path is equal to or less than the line energy of the laser beam during the intermediate stage of advancing the laser beam along the weld path.

13. The method set forth in claim 1, wherein at least one of the first or second aluminum alloy workpieces comprises a non-heat-treatable aluminum alloy base layer that includes between 0.2 wt % and 6.2 wt % magnesium.

14. The method set forth in claim 1, wherein at least one of the first or second aluminum alloy workpieces comprises a heat-treatable aluminum alloy base layer that includes between 0.2 wt % and 3.0 wt % magnesium and 0.2 wt % and 1.8 wt % silicon.

15. The method set forth in claim 1, wherein at least one of the first or second aluminum alloy workpieces comprises a heat-treatable aluminum alloy base layer that includes between 0.8 wt % and 12 wt % zinc.

16. A method of laser welding a workpiece stack-up assembly that includes at least two aluminum alloy workpieces, the method comprising:
(a) accelerating a laser optic welding head from a rest position;
(b) transmitting a laser beam from the laser optic welding head and into a workpiece stack-up assembly that includes at least two overlapping aluminum alloy workpieces, the laser beam having a power level and impinging an accessible top surface of the workpiece stack-up assembly within a welding region;
(c) increasing the power level of the laser beam at a controlled rate up to a target power level while the laser optic welding head is accelerating and the laser beam is being advanced relative to the accessible top surface of the workpiece stack-up assembly along a beginning portion of a weld path during which time a travel speed of the laser beam is accelerated up to a target travel speed;
(d) maintaining the power level of the laser beam and the travel speed of the laser beam at the target power level and the target travel speed, respectively, while the laser optic welding head is moving and the laser beam is being advanced relative to the accessible top surface of the workpiece stack-up assembly along a middle portion of the weld path;
(e) decelerating the laser optic welding head to a rest position;
(f) decreasing the power level of the laser beam at a controlled rate down from the target power level while the laser optic welding head is decelerating and the laser beam is being advanced relative to the accessible top surface of the workpiece stack-up assembly along an ending portion of the weld path during which time the travel speed of the laser beam is decelerated down from the target travel speed; and
(h) halting transmission of the laser beam from the laser optic welding head into the workpiece stack-up assembly;
wherein advancement of the laser beam along the weld path from the beginning portion to the ending portion forms a laser weld joint comprised of resolidified aluminum alloy workpiece material that penetrates through the workpiece stack-up assembly from the accessible top surface and at least across a faying interface established between the first and second aluminum alloy workpieces to fusion weld at least the first and second aluminum alloy workpieces together;
wherein the laser beam has a line energy, which is defined by the equation $E_L = P_L/S_L$, wherein $E_L$ is the line energy of the laser beam, $P_L$ is the power level of the laser beam, and $S_L$ is the travel speed of the laser beam;
wherein transmitting the laser beam from the laser optic welding head is delayed until after the laser optic welding head has begun accelerating from the rest position in step (a) to limit the line energy of the laser beam in the beginning portion of the weld path to no more than 10% greater than the line energy of the laser beam in the middle portion of the weld path, and/or halting transmission of the laser beam from the laser optic welding head occurs before the laser optic welding head has finished decelerating to the rest position in step (e) to limit the line energy of the laser beam in the ending portion of the weld path to no more than 10% greater than the line energy of the laser beam in the middle portion of the weld path.

17. The method set forth in claim 16, wherein the workpiece stack-up assembly further comprises a third aluminum alloy workpiece that overlaps and contacts the second aluminum alloy workpiece to establish a second faying interface within the workpiece stack-up assembly, and wherein a keyhole and a molten aluminum alloy weld pool traverse both the first and second faying interfaces such that the laser weld joint fusion welds the first, second, and third aluminum alloy workpieces together.

18. The method set forth in claim 16, wherein the power level of the laser beam is increased from below 0.05 kW up to the target power level at a controlled rate of 2.8 kW/s to 20 kW/s while, at the same time, the travel speed of the laser beam is accelerated up to the target travel speed at a rate of 170 m/min$^2$ to 1200 m/min$^2$, and wherein the target power level is between 2 kW and 6 kW and the target travel speed of the laser beam is between 2 m/min and 5 m/min.

19. The method set forth in claim 16, wherein the target power level is between 2 kW and 6 kW and the target travel speed of the laser beam is between 2 m/min and 5 m/min, and wherein the power level of the laser beam is decreased from the target power level to below 0.05 kW at a controlled rate of 2.8 kW/s to 20 kW/s while, at the same time, the travel speed of the laser beam is decelerated from the target travel speed at a rate of 170 m/min$^2$ to 1200 m/min$^2$.

20. A method of laser welding a workpiece stack-up assembly that includes at least two aluminum alloy workpieces, the method comprising:
advancing a laser beam relative to an accessible top surface of a workpiece stack-up assembly that includes at least two overlapping aluminum alloy workpieces to form a laser weld joint, the laser beam being advanced along a weld path that includes a beginning portion, a middle portion following the beginning portion, and an ending portion following the middle portion, the laser beam having a power level and being advanced along the weld path at a travel speed, the laser beam having a line energy, which is defined by the equation $E_L=P_L/S_L$, wherein $E_L$ is the line energy of the laser beam, $P_L$ is the power level of the laser beam, and $S_L$ is the travel speed of the laser beam, and, wherein, during advancement of the laser beam along the middle portion of the weld path, the power level of the laser beam is maintained at a target power level and the travel speed of the laser beam is maintained at a target travel speed;

increasing the power level of the laser beam up to the target power level at a controlled rate during advancement of the laser beam along the beginning portion of the weld path while the travel speed of the laser beam along the weld path is accelerated up to the target travel speed, wherein increasing the power level of the laser beam up to the target power level at a controlled rate keeps the line energy of the laser beam along the beginning portion of the weld path equal to or less than the line energy along the middle portion of the weld path; and decreasing the power level of the laser beam down from the target power level at a controlled rate during advancement of the laser beam along the ending portion of the weld path while the travel speed of the laser beam along the weld path is decelerated from the target travel speed, wherein decreasing the power level of the laser beam down from the target power level at a controlled rate keeps the line energy of the laser beam along the ending portion of the weld path equal to or less than the line energy along the middle portion of the weld path;

wherein the laser weld joint is comprised of resolidified aluminum alloy workpiece material that penetrates through the workpiece stack-up assembly to fusion weld the at least two overlapping aluminum alloy workpieces together, the weld joint being narrower at the accessible top surface of the workpiece stack-up assembly within the beginning portion and the ending portion of the weld path compared to the middle portion of the weld path due to the line energy of the laser beam along the beginning portion of the weld path and the line energy of the laser beam along the ending portion of the weld path both being equal to or less than the line energy of the laser beam along the middle portion of the weld path.

* * * * *